US008971549B2

(12) United States Patent
Sekiya

(10) Patent No.: US 8,971,549 B2
(45) Date of Patent: Mar. 3, 2015

(54) AUDIO SIGNAL PROCESSING APPARATUS, AUDIO SIGNAL PROCESSING METHOD, AND PROGRAM

(75) Inventor: Toshiyuki Sekiya, Kanagawa (JP)

(73) Assignee: Sony Corporation (JP)

( * ) Notice: Subject to any disclaimer, the term of this patent is extended or adjusted under 35 U.S.C. 154(b) by 811 days.

(21) Appl. No.: 13/179,721

(22) Filed: Jul. 11, 2011

(65) Prior Publication Data

US 2012/0020495 A1 Jan. 26, 2012

(30) Foreign Application Priority Data

Jul. 22, 2010 (JP) .............................. P2010-164855

(51) Int. Cl.
*H04B 15/00* (2006.01)
*G10L 21/0208* (2013.01)
*G10L 21/0216* (2013.01)
*G10L 25/09* (2013.01)

(52) U.S. Cl.
CPC ......... *G10L 21/0208* (2013.01); *G10L 21/0216* (2013.01); *G10L 25/09* (2013.01)
USPC ........................................................ 381/94.3

(58) Field of Classification Search
CPC . G10L 21/0208; H04R 2225/43; H04R 3/005
USPC .................. 381/94.1–94.4, 71.1–71.4, 71.11, 381/71.12, 73.1
See application file for complete search history.

(56) References Cited

U.S. PATENT DOCUMENTS

| | | | | |
|---|---|---|---|---|
| 6,690,805 | B1 * | 2/2004 | Tsuji et al. | 381/94.1 |
| 7,697,699 | B2 * | 4/2010 | Ozawa | 381/94.1 |
| 8,300,834 | B2 * | 10/2012 | Yoshioka | 381/56 |
| 2005/0018862 | A1 * | 1/2005 | Fisher | 381/98 |

FOREIGN PATENT DOCUMENTS

JP 2005-303681 A 10/2005

* cited by examiner

*Primary Examiner* — Lun-See Lao
(74) *Attorney, Agent, or Firm* — Lerner, David, Littenberg, Krumholz & Mentlik, LLP

(57) ABSTRACT

The present disclosure provides a audio signal processing apparatus including, an amplitude detector configured to detect a noise start point of an audio signal including a noise signal by comparing an amplitude value of the audio signal with a threshold value, a frequency feature calculator configured to calculate a frequency feature representing at least a frequency characteristic of the audio signal after the noise start point, and a noise determiner configured to determine a leg continuously including high-frequency components equal to or higher than a reference frequency in the audio signal after the noise start point as a noise leg based on the frequency feature.

13 Claims, 31 Drawing Sheets

AUDIO SIGNAL PROCESSING APPARATUS, AUDIO SIGNAL PROCESSING METHOD, AND PROGRAM

CROSS-REFERENCE TO RELATED APPLICATION

The present application claims priority from Japanese Patent Application No. JP 2010-164855 filed in the Japanese Patent Office on Jul. 22, 2010, the entire content of which is incorporated herein by reference.

BACKGROUND

The present disclosure relates to an audio signal processing apparatus, an audio signal processing method, and a program.

Audio recording apparatus such as IC recorder and video camcorder records ambient audio by its built-in small microphone. In the audio recording by the audio recording apparatus, an operation sound generated when the user operates this audio recording apparatus by using e.g. an operation button is mixed into the recorded audio as noise. So, there has been proposed a technique to detect and reduce the operation sound mixed as noise in the audio recording in the audio recording apparatus (refer to e.g. Japanese Patent Laid-open No. 2005-303681 (hereinafter, Patent Document 1)).

SUMMARY

In the related-art noise detecting method like that described in Patent Document 1, the main detection subject is the operation sound of the operation button mounted on audio recording apparatus itself. This operation sound generally appears as a pulse-like noise signal on the audio signal obtained by audio recording. Therefore, noise due to the operation sound can be easily detected by comparing the amplitude value (signal level) of this pulse-like noise signal with a threshold value.

However, particular sudden noise generated at a position separate from audio recording apparatus appears as a nonstationary noise signal having long duration, and thus is difficult to detect. For example, when the audio of a meeting is recorded by an IC recorder placed on a desk, operation sounds of a keyboard (hereinafter, referred to as keyboard sound) of a notebook personal computer (hereinafter, referred to as notebook PC) used by a meeting attendee are often recorded by the IC recorder at a position separate from the notebook PC and mixed into the recorded audio as noise.

The particular sudden noise generated by a noise generation source separate from audio recording apparatus, like this keyboard sound, is propagated to the audio recording apparatus through plural complex paths. Specifically, for example this noise is reflected in the space to the audio recording apparatus and propagated as vibration transmitted in the desk. As a result, if the keyboard sound or the like is recorded, its noise signal has longer duration compared with the above-described simple pulse-like noise and nonmonotonically attenuates. Therefore, in the related-art noise detecting method, in which the amplitude value of an audio signal is merely compared with a threshold value, it is difficult to properly detect particular sudden noise such as the keyboard sound.

So, there is a need for a technique to enable proper detection of particular sudden noise that has comparatively-long duration and nonmonotonically attenuates, like the above-described keyboard sound.

According to an embodiment of the present disclosure, there is provided an audio signal processing apparatus including an amplitude detector configured to detect a noise start point of an audio signal including a noise signal by comparing the amplitude value of the audio signal with a threshold value, a frequency feature calculator configured to calculate a frequency feature representing at least a frequency characteristic of the audio signal after the noise start point, and a noise determiner configured to determine a leg continuously including high-frequency components equal to or higher than a reference frequency in the audio signal after the noise start point as a noise leg based on the frequency feature.

According to another embodiment of the present disclosure, there is provided an audio signal processing method including detecting a noise start point of an audio signal including a noise signal by comparing the amplitude value of the audio signal with a threshold value, calculating a frequency feature representing at least a frequency characteristic of the audio signal after the noise start point, and determining a leg continuously including high-frequency components equal to or higher than a reference frequency in the audio signal after the noise start point as a noise leg based on the frequency feature.

According to another embodiment of the present disclosure, there is provided a program for causing a computer to execute detecting a noise start point of an audio signal including a noise signal by comparing the amplitude value of the audio signal with a threshold value, calculating a frequency feature representing at least a frequency characteristic of the audio signal after the noise start point, and determining a leg continuously including high-frequency components equal to or higher than a reference frequency in the audio signal after the noise start point as a noise leg based on the frequency feature.

According to the above-described configurations, the amplitude value of an audio signal including a noise signal is compared with a threshold value and thereby a noise start point of the audio signal is detected. Furthermore, a frequency feature representing at least a frequency characteristic of the audio signal after the noise start point is calculated. Based on the frequency feature, a leg continuously including high-frequency components equal to or higher than a reference frequency in the audio signal after the noise start point is determined as a noise leg. Due to this technique, a leg continuously including high-frequency components included in the particular noise signal of a keyboard sound or the like can be determined as a noise leg in an audio signal.

As described above, according to the embodiments of the present disclosure, particular sudden noise that has comparatively-long duration and nonmonotonically attenuates, like a keyboard sound, can be properly detected.

DETAILED DESCRIPTION OF THE PREFERRED EMBODIMENTS

Figure 1:
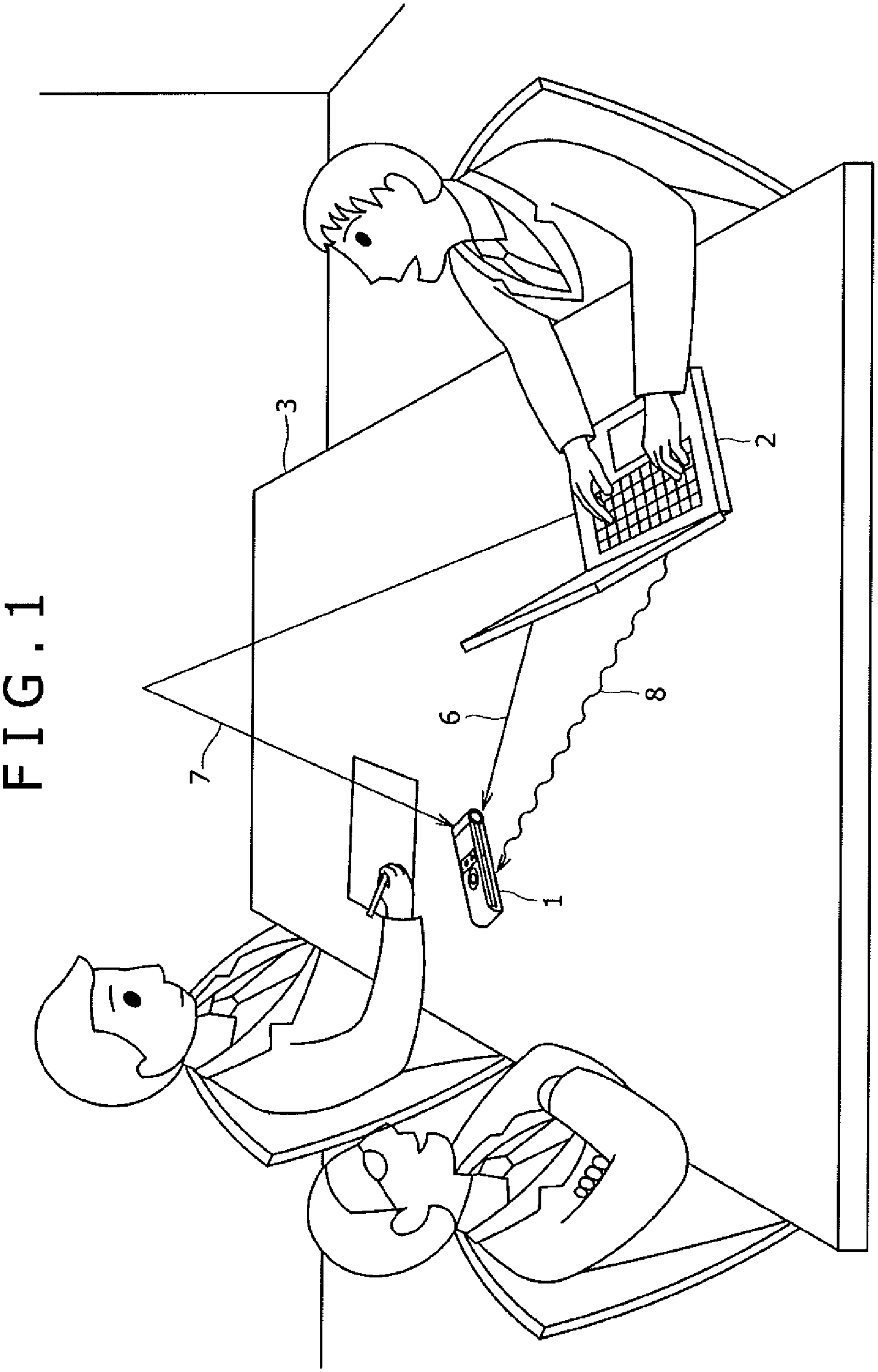
FIG. 1 is a schematic diagram of an example of an audio recording situation to which audio signal processing apparatus and method according to a first embodiment of the present disclosure are applied.

Preferred embodiments of the present disclosure will be described in detail below with reference to the accompanying drawings. In the present specification and the drawings, the constituent element having substantially the same functional configuration is given the same numeral to thereby omit overlapping description.

The order of the description is as follows.

1. First Embodiment (example in which frequency feature and attenuation feature are used)
   - 1.1. Outline of Noise Detecting Method
   - 1.2. Whole Configuration of Audio Signal Processing Apparatus
   - 1.2.1. Hardware Configuration of Audio Signal Processing Apparatus
   - 1.2.2. Functional Configuration of Audio Signal Processing Apparatus
   - 1.3. Details of Amplitude Detector
   - 1.3.1. Configuration of Amplitude Detector
   - 1.3.2. Operation of Amplitude Detector
   - 1.4. Details of Frequency Feature Calculator
   - 1.4.1. Configuration of Frequency Feature Calculator
   - 1.4.2. Basic Operation of Frequency Feature Calculator
   - 1.4.3. Specific Example of Frequency Feature
   - 1.4.4. Frequency Characteristic of Keyboard Sound
   - 1.4.5. Detailed Operation of Frequency Feature Calculator
   - 1.5. Details of Attenuation Feature Calculator
   - 1.5.1. Configuration of Attenuation Feature Calculator
   - 1.5.2. Operation of Attenuation Feature Calculator
   - 1.6. Details of Noise Determiner
   - 1.6.1. Configuration of Noise Determiner
   - 1.6.2. Operation of Noise Determiner
2. Second Embodiment (example in which frequency feature is used)
   - 2.1. Functional Configuration of Audio Signal Processing Apparatus
   - 2.2. Operation of Audio Signal Processing Apparatus
3. Conclusion

1. First Embodiment

[1.1. Outline of Noise Detecting Method]

First, the outline of an audio signal processing method for detecting particular sudden noise according to a first embodiment of the present disclosure will be described below.

The audio signal processing apparatus and method according to the present embodiment relate to a technique to detect and reduce sudden, nonstationary noise mixed in an audio signal obtained by audio collection when ambient audio is recorded by audio recording apparatus such as an IC recorder. In particular, in the audio signal processing apparatus and method according to the present embodiment, the detection subject is particular sudden noise (e.g. keyboard sound) generated from a noise generation source (e.g. notebook PC) at a position separate from audio recording apparatus.

As a general method for detecting and reducing noise in recorded audio, there is a technique to detect and reduce noise due to operation sounds generated when operation button, switch, and so forth mounted on audio recording apparatus are operated. However, a technique with focus on detection of particular sudden noise such as the above-described keyboard sound is not known. The present embodiment is to properly detect particular sudden noise such as the above-described keyboard sound. This can reduce the noise in reproduction of recorded audio and enable the user to listen to the recorded audio more easily.

FIG. 1 is a schematic diagram showing an example of an audio recording situation to which the audio signal processing apparatus and method according to the present embodiment are applied. In this assumed situation shown in FIG. 1, plural meeting attendees surround a desk 3 and have a meeting, and the audio of the meeting is recorded by using audio recording apparatus 1 placed on the desk 3. In this meeting, when the person who makes the meeting minutes records a note of the content of the meeting by using a notebook PC 2, click-clack keyboard sounds are generated suddenly and intermittently by pressing down of the keyboard of the notebook PC 2. Therefore, the audio recording apparatus 1 records not only the content of the meeting (voice of the meeting attendees) as the recording subject but also the keyboard sounds propagated from the notebook PC 2 as noise. Furthermore, e.g. collision sounds generated when an attendee hits the desk 3 and when a writing material or the like is dropped onto the desk 3 are also recorded as noise by the audio recording apparatus 1.

As just described, when the audio recording apparatus 1 and the notebook PC 2 are placed separately by a predetermined distance (e.g. 50 cm) or longer, particular sudden noise such as the above-described keyboard sound and collision sound is often mixed in the recorded audio as noise. When this recorded audio is reproduced and heard, noise such as the keyboard sound is discomfort for the hearer and interferes with hearing of the recorded audio. Therefore, it is preferable to properly detect and reduce not only the operation sound generated when the operation button of the audio recording apparatus 1 is directly operated but also particular sudden noise such as the above-described keyboard sound generated at a position separate from the audio recording apparatus 1.

Figure 2:
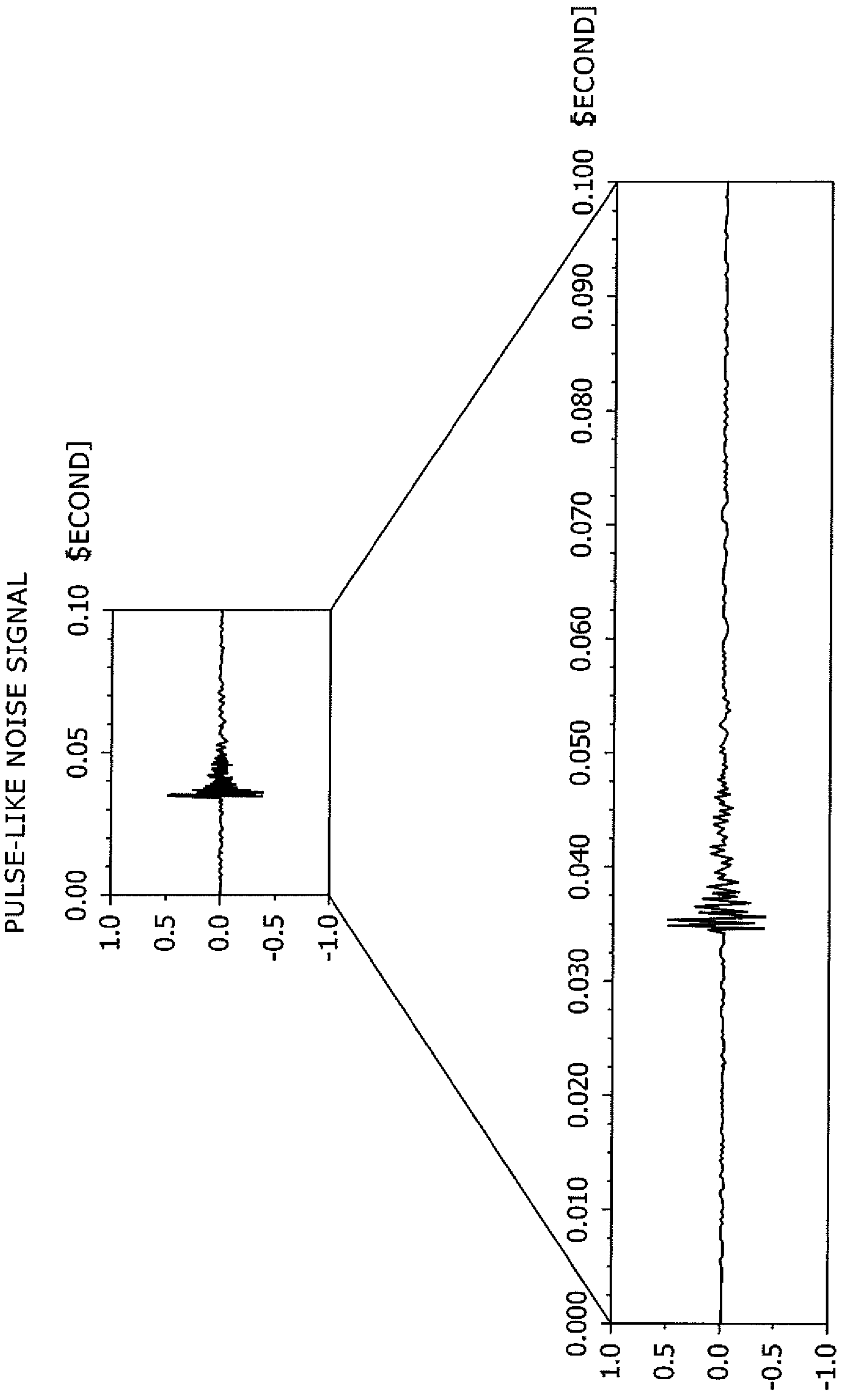
FIG. 2 is a waveform diagram showing the noise signal of pulse-like noise such as an operation sound of audio recording apparatus according to the first embodiment.
Figure 3:
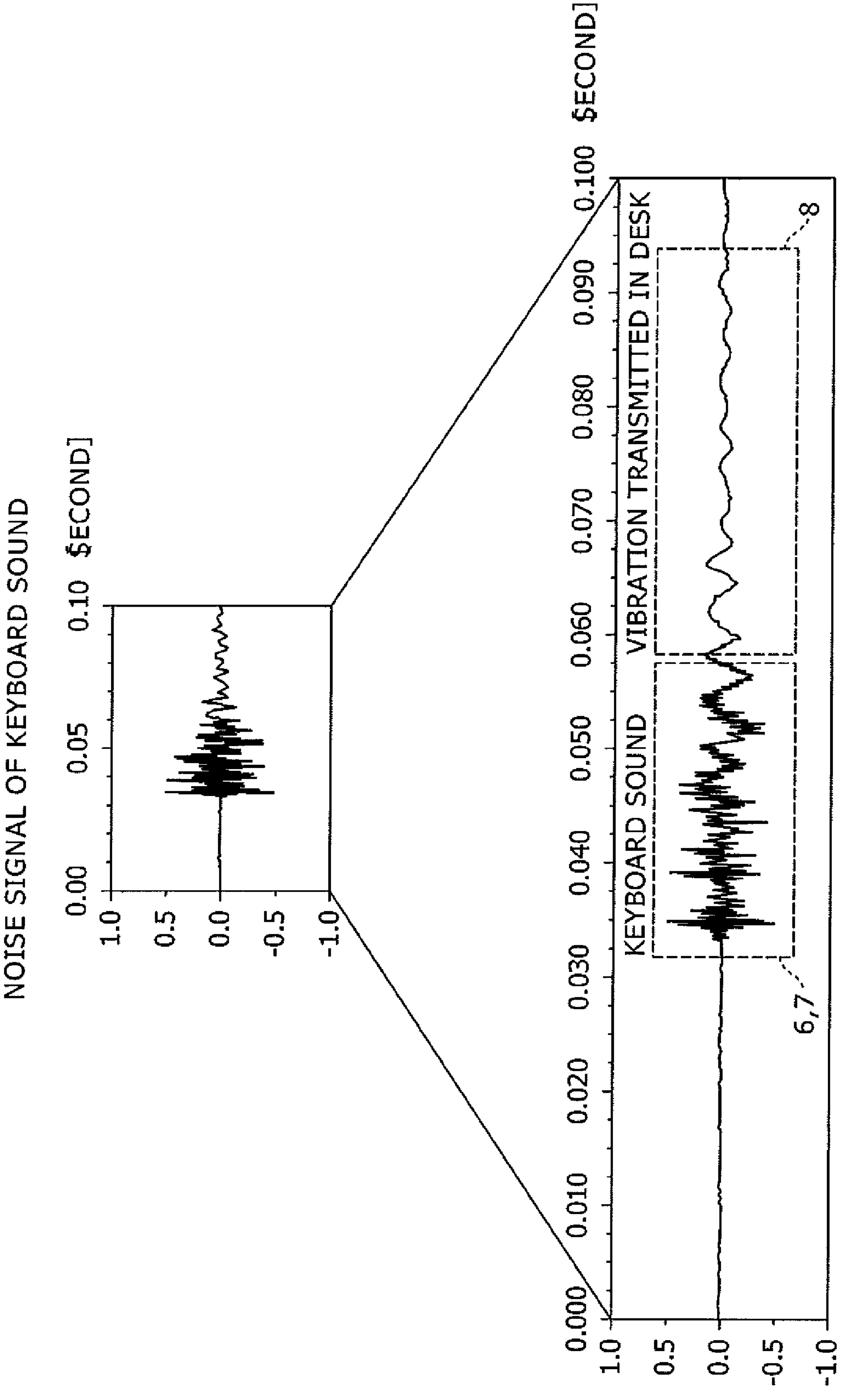
FIG. 3 is a waveform diagram showing the noise signal of particular noise such as a keyboard sound of a notebook PC according to the first embodiment.

The difference in the characteristics between the operation sound of the audio recording apparatus 1 and the keyboard sound of the notebook PC 2 will be described below with reference to FIG. 2 and FIG. 3. FIG. 2 is a waveform diagram showing the noise signal of pulse-like noise such as an operation sound of the audio recording apparatus 1. FIG. 3 is a waveform diagram showing the noise signal of particular noise such as a keyboard sound of the notebook PC 2.

As shown in FIG. 2, the operation sound generated when the operation button provided in the audio recording apparatus 1 is pressed down forms sudden noise that attenuates instantaneously and monotonically. That is, the noise signal of this operation sound is a pulse-like signal. Its duration is comparatively-short (e.g. 0.01 seconds or shorter) and its attenuation is sharp and monotonic. Therefore, merely by comparing the noise signal of this operation sound with a threshold value, this noise signal can be detected comparatively easily.

In contrast, as shown in FIG. 3, the keyboard sound is particular sudden noise generated at a position separate from the audio recording apparatus 1 by a predetermined distance (e.g. 50 cm) or longer and the noise signal of this particular sudden noise has characteristics different from those of the above-described operation sound. Specifically, as shown in FIG. 1, in transmission from the noise generation source (e.g. notebook PC 2) to the audio recording apparatus 1, the particular sudden noise is not only propagated in the air as a direct sound 6 but also propagated through plural paths to reach the audio recording apparatus 1. For example, this noise is propagated as a reflected sound 7 resulting from spatial reflection by wall, ceiling, etc. and propagated as vibration 8 transmitted in the desk 3. Therefore, as shown in FIG. 3, the noise signal obtained by recording particular sudden noise such as a keyboard sound is a signal that has longer duration (0.02 seconds or longer) compared with the above-described pulse-like noise signal and nonmonotonically attenuates. Therefore, it is difficult to detect this signal as a pulse signal.

For example, when a meeting attendee operates the keyboard of the notebook PC 2 in the example of FIG. 1, a certain amount of time is taken from the start of the contact of a finger with a button of the keyboard until sufficient pressing down of this button. Thus, one time of pushing down of the button generates two times of sounds with an interval of the certain amount of time. Therefore, the noise signal of the keyboard sound is a signal that attenuates irregularly and nonmonotonically. Furthermore, the vibration 8 accompanying the keyboard operation is propagated from the notebook PC 2 to the audio recording apparatus 1 through the desk 3. This vibration 8 is transmitted later than the keyboard sounds 6 and 7 propagated in the air.

As just described, in the particular noise signal of the keyboard sound or the like, nonmonotonic signal attenuation continues for a long time and is observed simultaneously with the vibration 8 as another sound that reaches the audio recording apparatus 1 later. Therefore, it is difficult to detect particular sudden noise of the above-described keyboard sound or the like by the related-art simple detecting method in which the signal level is merely compared with a threshold value.

So, in the audio signal processing method according to the present embodiment, attention is paid not only to the signal level of an audio signal but also to other factors. Specifically, the following three determination factors are used: (1) the signal level (amplitude value) of an audio signal, (2) the duration of high-frequency components of the audio signal, and (3) the attenuation state of the audio signal. By utilizing these factors, the trapezoidal characteristic of the noise signal of the above-described particular sudden noise is captured to thereby detect the particular noise signal included in the audio signal.

Figure 4:
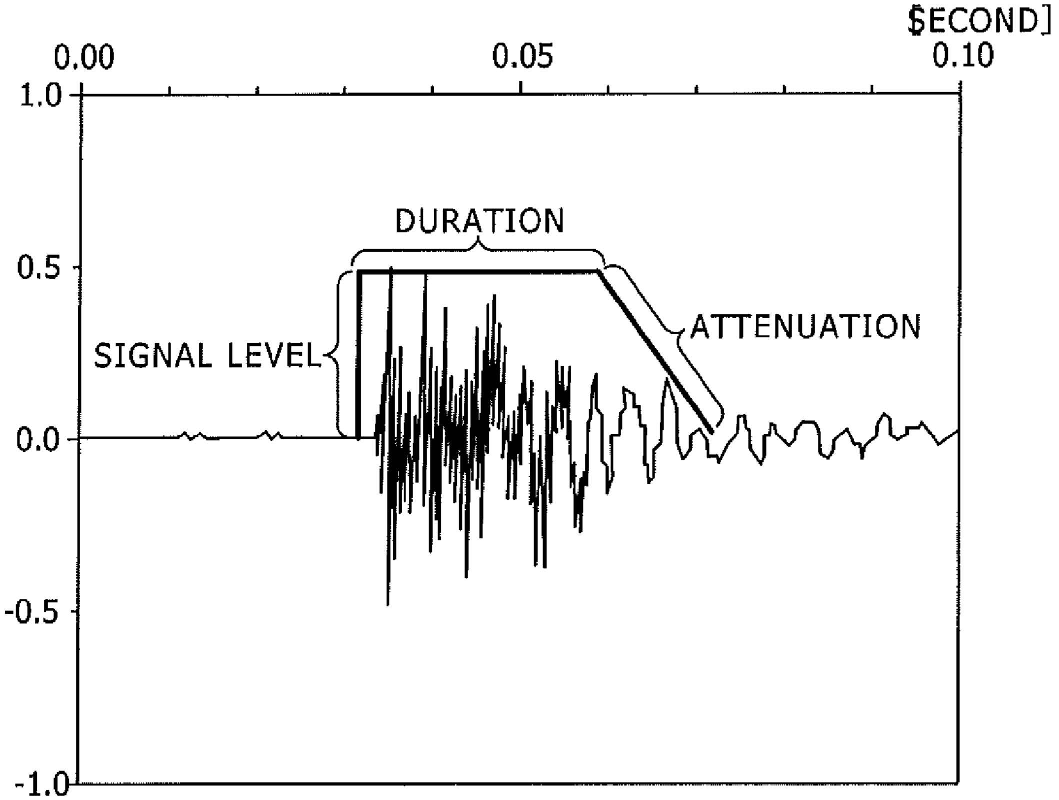
FIG. 4 is a waveform diagram schematically showing three determination factors for detecting a noise signal according to the first embodiment.

FIG. 4 is a waveform diagram schematically showing three determination factors for detecting a noise signal by the audio signal processing method according to the present embodiment. As shown in FIG. 4, the rising edge (i.e. noise start point P) of a noise signal included in an audio signal can be detected by using (1) the signal level of the audio signal. Furthermore, the particular noise signal of the above-described keyboard sound or the like includes high-frequency components whose frequency is higher than that of normal audio and is equal to or higher than a reference frequency (e.g. 4 kHz) over a predetermined time Tth or longer continuously. Therefore, whether or not a particular noise signal is included in the audio signal can be detected by detecting whether or not (2) the duration of high-frequency components of the audio signal is equal to or longer than the predetermined time Tth. Moreover, the particular noise signal of the above-described keyboard sound or the like does not monotonically attenuate differently from the above-described pulse-like noise signal but nonmonotonically attenuates over a comparatively-long time. Therefore, whether or not a particular noise signal is included in the audio signal can be detected by detecting (3) the attenuation state of the audio signal.

As just described, in the audio signal processing method according to the present embodiment, the trapezoidal characteristic (see FIG. 4) of the waveform of the particular noise signal of a keyboard sound or the like is captured by using three determination factors (1) to (3), to thereby properly detect the particular noise signal included in the audio signal. The audio signal processing method according to the present embodiment and the audio signal processing apparatus for carrying out it will be described in detail below.

[1.2. Whole Configuration of Audio Signal Processing Apparatus]

The configuration of the audio signal processing apparatus according to the present embodiment will be described below. For the present embodiment, a description will be made by taking a reproducing device that reproduces an audio signal obtained by audio recording by the audio recording apparatus 1 as one example of the audio signal processing apparatus. The reproducing device may be any device as long as it is a device having an audio reproducing function by use of software or hardware. The following description will deal with an example of a personal computer (hereinafter, referred to as PC) as the reproducing device.

For example, the data of audio recorded by the audio recording apparatus 1 (hereinafter, recorded audio) is provided to the audio signal processing apparatus such as a PC via a recording medium or a network. Thereby, the audio signal processing apparatus reproduces the data of the recorded audio and outputs audio from an audio output device such as a speaker. In the reproduction of this recorded audio, the audio signal processing apparatus detects a noise signal in the audio signal and reduces the noise signal. A configuration example of the audio signal processing apparatus will be described below.

[1.2.1. Hardware Configuration of Audio Signal Processing Apparatus]

Figure 5:
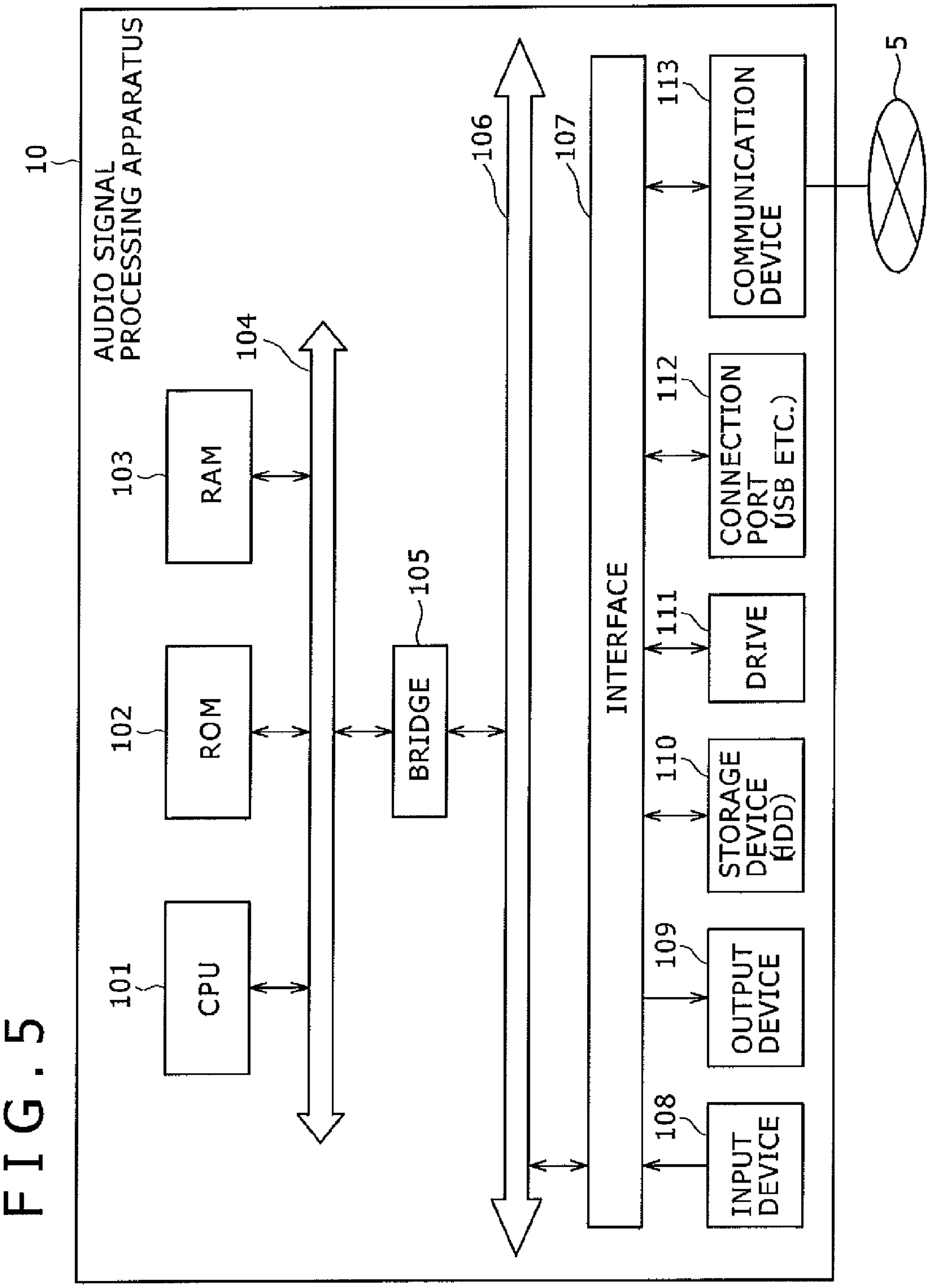
FIG. 5 is a block diagram showing the hardware configuration of a PC as the audio signal processing apparatus according to the first embodiment.

First, with reference to FIG. 5, a hardware configuration example of an audio signal processing apparatus 10 will be described below. FIG. 5 is a block diagram showing the hardware configuration of a PC as the audio signal processing apparatus 10 according to the present embodiment.

As shown in FIG. 5, the audio signal processing apparatus 10 includes e.g. a CPU (Central Processing Unit) 101, a ROM (Read Only Memory) 102, a RAM (Random Access Momery) 103, a host bus 104, a bridge 105, an external bus 106, an interface 107, an input device 108, an output device 109, a storage device 110, a drive 111, a connection port 112, and a communication device 113. In this manner, the audio signal processing apparatus 10 can be configured by using e.g. general-purpose computer apparatus.

The CPU 101 functions as arithmetic processing device and control device and operates in accordance with various kinds of programs to control the respective units in the audio signal processing apparatus 10. This CPU 101 executes various kinds of processing in accordance with a program stored in the ROM 102 or a program loaded from the storage device 110 into the RAM 103. The ROM 102 stores the program used by the CPU 101, arithmetic parameters, etc. and functions also as a buffer for reducing access from the CPU 101 to the storage device 110. The RAM 103 temporarily stores the program used in execution by the CPU 101, parameters that accordingly change in the execution, etc. These units are connected to each other by the host bus 104 formed of e.g. a CPU bus. The host bus 104 is connected to the external bus 106 such as a peripheral component interconnect/interface (PCI) bus via the bridge 105.

In a memory part (e.g. ROM 102 and flash memory (not shown)) provided in association with the CPU 101, a program for making the CPU 101 execute various kinds of control processing is stored. Based on this program, the CPU 101 executes the necessary arithmetic processing for control processing for the respective units.

The program according to the present embodiment is a program for making the CPU 101 execute the above-described various kinds of control of the CPU 101. This program can be stored in advance in the memory device (storage device 110, ROM 102, flash memory, etc.) incorporated in the audio signal processing apparatus 10. Alternatively, this program may be stored in an optical disk such as CD (Compact Disk), DVD (Digital Versatile Disk), Blu-ray disk or a removable recording medium such as a memory card and provided to the audio signal processing apparatus 10. More alternatively, the program may be downloaded to the audio signal processing apparatus 10 via a network 5 such as a LAN (Local Area Network) or the Internet.

The input device 108 is composed of e.g. operating components such as mouse, keyboard, touch panel, button, switch, and lever and an input control circuit that generates an input signal and outputs it to the CPU 101. The output device 109 is composed of e.g. a display device such as a liquid crystal display (LCD) device, a cathode ray tube (CRT) display device, or an organic EL display device and an audio output device such as a speaker.

The storage device 110 is a storage device for storing various kinds of data and is configured with e.g. an external or built-in disk drive such as a hard disk drive (HDD). This storage device 110 drives the hard disk as a storage medium and stores the program executed by the CPU 101 and various kinds of data. The drive 111 is a reader/writer for storage medium and is provided as a built-in or external component of the audio signal processing apparatus 10. This drive 111 writes/reads various kinds of data to/from a removable storage medium, such as a magnetic disk, an optical disk, a magnetooptical disk, or a semiconductor memory, loaded in the audio signal processing apparatus 10.

The connection port 112 is a port for connecting external peripheral apparatus and has a connection terminal of e.g. the USB or IEEE 1394. The connection port 112 is connected to the CPU 101 and so forth via the interface 107, the external bus 106, the bridge 105, the host bus 104, and so forth. The communication device 113 is a communication interface configured with e.g. a communication device for connection to the network 5. This communication device 113 transmits/receives various kinds of data to/from an external device via the network 5.

[1.2.2. Functional Configuration of Audio Signal Processing Apparatus]

Figure 6:
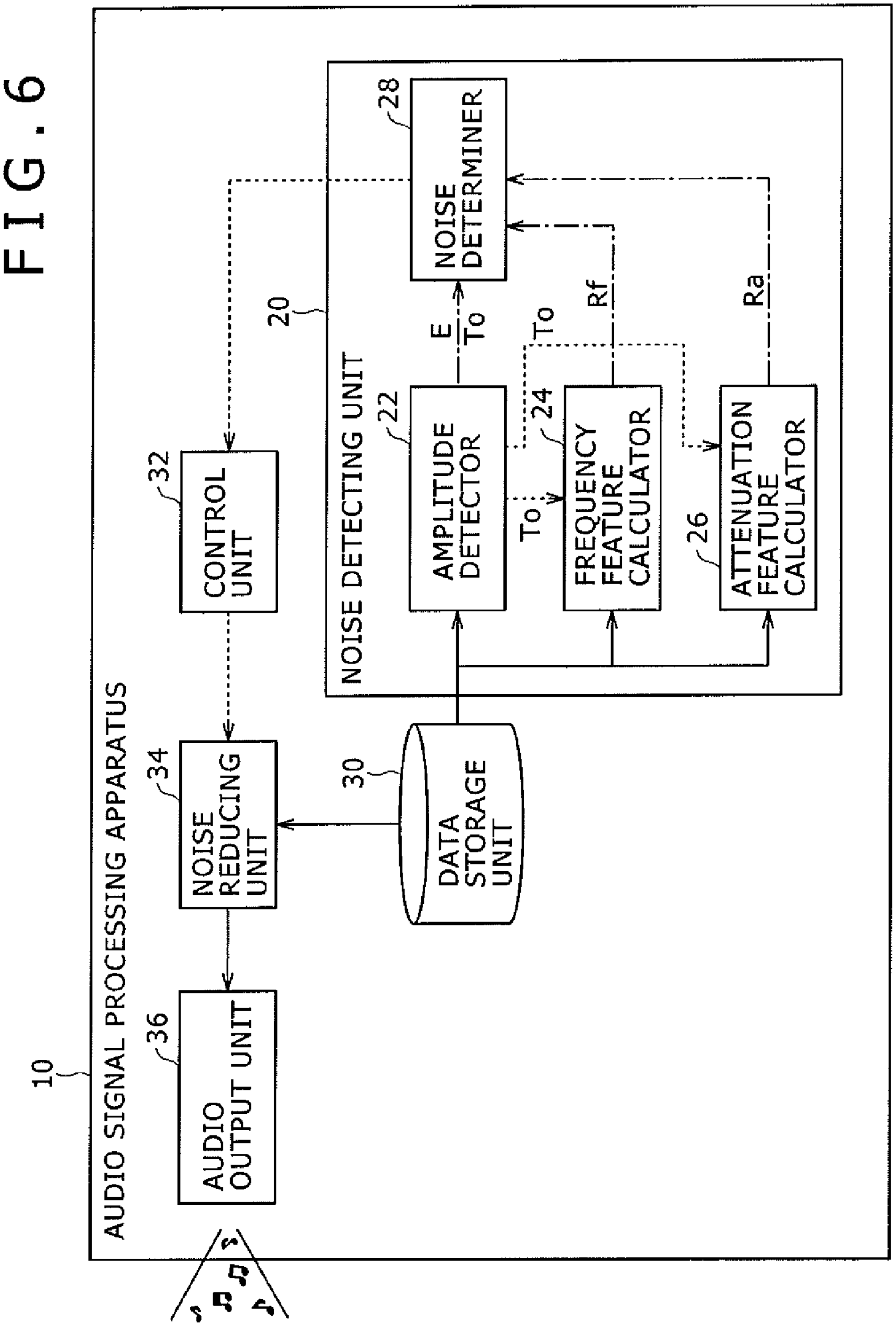
FIG. 6 is a block diagram showing the functional configuration of the audio signal processing apparatus according to the first embodiment.

A functional configuration example of the audio signal processing apparatus 10 according to the present embodiment will be described below with reference to FIG. 6. FIG. 6 is a block diagram showing the functional configuration of the audio signal processing apparatus 10 according to the present embodiment.

As shown in FIG. 6, the audio signal processing apparatus 10 includes a noise detecting unit 20, a data storage unit 30, a control unit 32, a noise reducing unit 34, and an audio output unit 36. These noise detecting unit 20, control unit 32, and noise reducing unit 34 may be configured by dedicated hardware or may be configured by software. In the case of using software, the CPU 101 of the audio signal processing apparatus 10 executes a program for realizing the functions of the respective functional units to be described below. In FIG. 6, the solid line arrowhead denotes a data line of an audio signal. The one-dot chain line arrowhead denotes a feature line. The dotted line arrowhead denotes a control line.

The data storage unit 30 is formed of e.g. a storage device such as a hard disk or a flash memory and stores audio data obtained by audio recording by the audio recording apparatus 1. For example, an audio signal obtained by audio recording by the audio recording apparatus 1 is provided to the audio signal processing apparatus 10 via a removable storage medium or the network 5 and stored in the data storage unit 30 as audio data. Furthermore, if the audio signal processing apparatus 10 includes an audio collecting device (not shown) such as a microphone and has an audio recording function, the control unit 32 of the audio signal processing apparatus 10 records an audio signal input from this audio collecting device in the data storage unit 30 as audio data. In reproduction of the recorded audio, the audio data is read out from the data storage unit 30 and reproduction processing such as decoding is executed. In this reproduction processing, the audio data read out from the data storage unit 30 is output to the noise detecting unit 20 and the noise reducing unit 34 as an audio signal having a waveform like that shown in FIG. 2 or FIG. 3 for example.

The control unit 32 is formed of e.g. the CPU 101 and controls the respective units in the audio signal processing apparatus 10. For example, the control unit 32 controls the operation of the noise reducing unit 34 so that a noise signal detected by the noise detecting unit 20 may be reduced.

The noise detecting unit 20 detects a noise signal included in an audio signal input from the data storage unit 30 and outputs the detection result to the control unit 32 in e.g. reproduction of recorded audio. The noise detection processing by this noise detecting unit 20 is a characteristic according to the present embodiment and therefore its details will be described later.

The noise reducing unit 34 reduces the noise signal detected by the noise detecting unit 20 from the audio signal input from the data storage unit 30 based on an instruction from the control unit 32. For the noise reduction processing by this noise reducing unit 34, any publicly-known technique can be employed. For example, the noise reducing unit 34 sets the signal level (amplitude value) of the noise signal included in the audio signal to almost zero or suppresses the signal level to a predetermined level or lower, to thereby reduce the noise signal included in the audio signal.

The audio output unit 36 is formed of e.g. a speaker. The audio signal resulting from the reduction of the noise signal by the noise reducing unit 34 is input to the audio output unit 36 and the audio output unit 36 outputs audio represented by this audio signal. The user hears the audio output from this audio output unit 36 and thereby can comprehend the content of the recorded audio.

Next, details of the configuration of the noise detecting unit 20 will be described below. As shown in FIG. 6, the noise detecting unit 20 includes an amplitude detector 22, a frequency feature calculator 24, an attenuation feature calculator 26, and a noise determiner 28.

The amplitude detector 22 detects an amplitude value A of an audio signal including a noise signal and compares this amplitude value A (signal level) with a predetermined threshold value Ath to detect the noise start point P of the audio signal based on the comparison result. The noise start point P means the start position of the particular noise signal (rising edge position of the noise signal) of the above-described keyboard sound or the like included in the audio signal. In the present embodiment, this noise start point P and a noise end point Q to be described later are specified based on the time when the audio signal is recorded for example. However, how these points are specified is not limited to this example. For example, the noise start point P and the noise end point Q can be specified by using any parameter representing the position on the time axis in the audio signal, such as the time code, the time from the beginning of the audio signal, the number of frames, or the number of bits.

The amplitude detector 22 notifies the noise determiner 28, the frequency feature calculator 24, and the attenuation feature calculator 26 of information representing the detected noise start point P. Furthermore, the amplitude detector 22 calculates the signal energy around the noise start point P of the audio signal and outputs this signal energy to the noise determiner 28 as an amplitude feature E.

The frequency feature calculator 24 analyzes the frequency characteristic of the leg from the vicinity of the noise start point P to the timing after the elapse of a predetermined time Tth, in the audio signal, and calculates a frequency feature Rf representing the frequency characteristic of this leg. The frequency feature Rf is e.g. a parameter representing the number of zero-cross points of the audio signal or a parameter representing the ratio of high-frequency components equal to or higher than the reference frequency (e.g. 4 kHz) to all frequency components of the audio signal. Because a particular noise signal of a keyboard sound or the like includes many high-frequency components equal to or higher than the reference frequency as described above, whether or not the particular noise signal is present and the duration of the particular noise signal can be determined by analyzing the frequency characteristic of the audio signal. The frequency feature calculator 24 outputs the calculated frequency feature Rf to the noise determiner 28.

The frequency feature calculator 24 may divide the audio signal after the noise start point P into plural legs (frames) and calculate the frequency feature Rf for each of the legs. This allows calculation of the frequency feature Rf for each of the plural legs obtained by segmentation of the audio signal after the noise start point P and thus can enhance the accuracy of the detection of whether or not a noise signal is present and the duration of the noise signal.

The attenuation feature calculator 26 analyzes the signal energy of the audio signal to thereby calculate an attenuation feature Ra representing the attenuation of a noise signal included in the audio signal. The attenuation feature Ra is e.g. a parameter representing the ratio between energy E1 of the audio signal around the noise start point P and energy E2 of the audio signal around the timing after the elapse of a predetermined time Td from the noise start point P. Because the particular noise signal of a keyboard sound or the like non-monotonically attenuates after keeping a high signal level over at least the predetermined time Tth as described above, the attenuation state of the particular noise signal can be determined by analyzing the time elapse of the signal energy of the audio signal. The attenuation feature calculator 26 outputs the calculated attenuation feature Ra to the noise determiner 28.

The attenuation feature calculator 26 may divide the audio signal after the noise start point P into plural legs (frames) and calculate the attenuation feature Ra for each of the legs. This allows calculation of the attenuation feature Ra for each of the plural legs obtained by segmentation of the audio signal after the noise start point P and thus can enhance the accuracy of the detection of the attenuation state of the noise signal.

The noise determiner 28 acquires the amplitude feature E, the frequency feature Rf, and the attenuation feature Ra from the amplitude detector 22, the frequency feature calculator 24, and the attenuation feature calculator 26, respectively. Furthermore, the noise determiner 28 determines whether or not a noise signal is present and determines a leg continuously including high-frequency components equal to or higher than the reference frequency in the audio signal as a noise leg, based on the amplitude feature E, the frequency feature Rf, and the attenuation feature Ra. The noise leg is a leg in which the noise signal of particular sudden noise such as the above-described keyboard sound is included in the audio signal.

For example, the noise determiner 28 compares the frequency feature Rf with a predetermined threshold value Rf_th and obtains the leg in which the frequency feature Rf is equal to or larger than this threshold value Rf_th. Furthermore, the noise determiner 28 compares the attenuation feature Ra with a predetermined threshold value Ra_th and determines the position at which the attenuation feature Ra becomes equal to or smaller than this threshold value Ra_th as the noise end point Q at which the noise signal attenuates to a predetermined basis or smaller. In addition, the noise determiner 28 determines the leg from the noise start point P to the noise end point Q in the leg continuously including high-frequency components equal to or higher than the reference frequency in the audio signal as a noise leg.

The noise determiner 28 outputs information representing the detected noise leg to the control unit 32. Thereby, the control unit 32 controls the noise reducing unit 34 to reduce the noise signal included in the noise leg of the audio signal.

The schematic configuration of the noise detecting unit 20 in the audio signal processing apparatus 10 according to the present embodiment has been described above. The noise detecting unit 20 according to the present embodiment not only detects the rising edge of a noise signal by using the amplitude value A of an audio signal but also models the duration of the noise signal and the degree of the attenuation of the signal energy. This allows proper determination as to whether or not the particular noise signal of a keyboard sound or the like included in recorded audio is present and the leg of the noise signal.

[1.3. Details of Amplitude Detector]

The configuration and operation of the amplitude detector 22 in the audio signal processing apparatus 10 according to the present embodiment will be described below.

[1.3.1. Configuration of Amplitude Detector]

Figure 7:
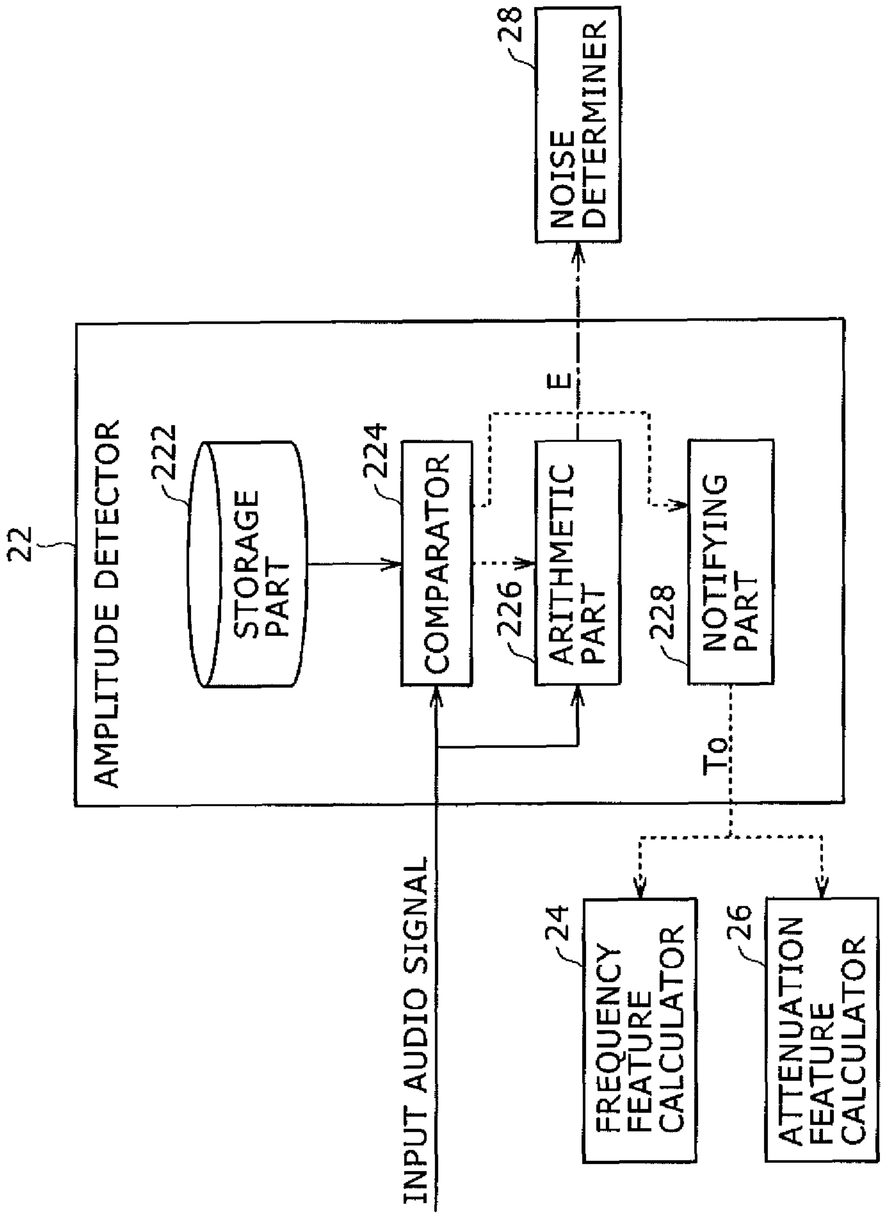
FIG. 7 is a block diagram showing the configuration of an amplitude detector according to the first embodiment.

First, with reference to FIG. 7, the configuration of the amplitude detector 22 according to the present embodiment will be described. FIG. 7 is a block diagram showing the configuration of the amplitude detector 22 according to the present embodiment.

As shown in FIG. 7, the amplitude detector 22 includes a storage part 222, a comparator 224, an arithmetic part 226, and a notifying part 228. To the comparator 224 and the arithmetic part 226, a reproduced audio signal is input from the external.

The storage part 222 stores the threshold value Ath of the amplitude value, which serves as the criterion for determination of the rising edge of a noise signal. The comparator 224 reads out the threshold value Ath from the storage part 222 and compares the amplitude value A of the input audio signal with the threshold value Ath to detect the noise start point P based on the comparison result. As a result, when the signal level of the audio signal suddenly rises up and the amplitude value A of the audio signal, which has been smaller than the threshold value Ath thus far, becomes larger than the threshold value Ath, the comparator 224 transmits a base time T0 representing the noise start point P to the arithmetic part 226 and the notifying part 228.

Upon the detection of the noise start point P, the arithmetic part 226 detects the input audio signal and calculates the signal energy E around the noise start point P of this audio signal to notify the noise determiner 28 of this signal energy E as the amplitude feature. Furthermore, upon the detection of the noise start point P, the notifying part 228 notifies the frequency feature calculator 24 and the attenuation feature calculator 26 of the base time T0 representing the noise start point P.

[1.3.2. Operation of Amplitude Detector]

Figure 8:
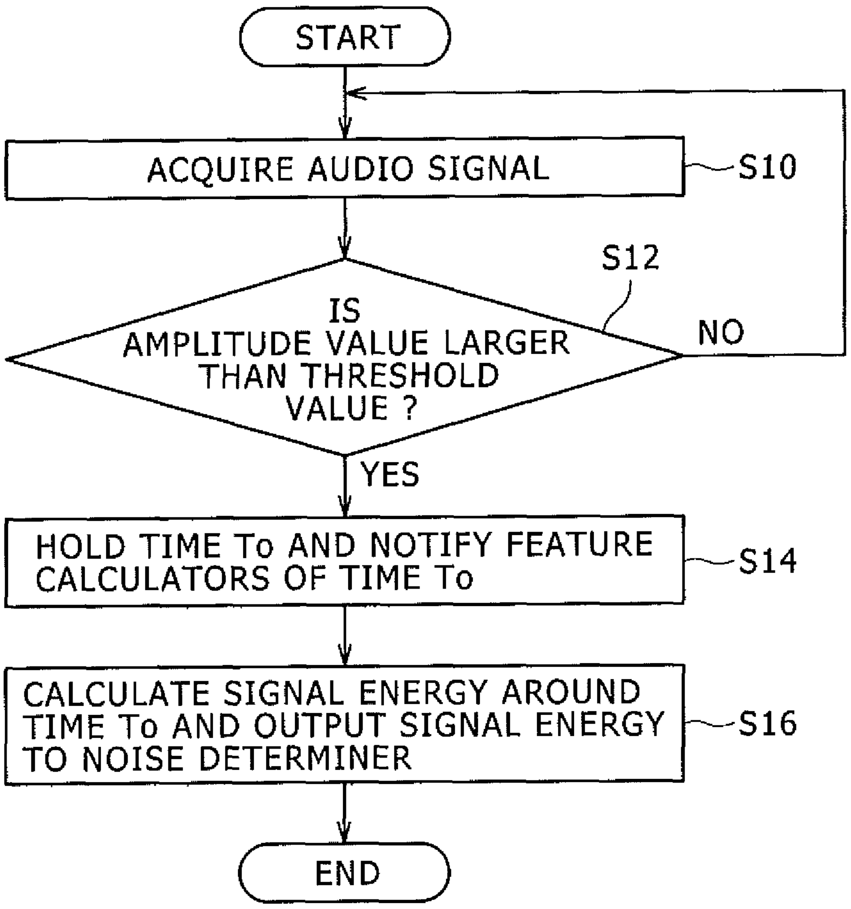
FIG. 8 is a flowchart showing the basic operation of the amplitude detector according to the first embodiment.
Figure 9:
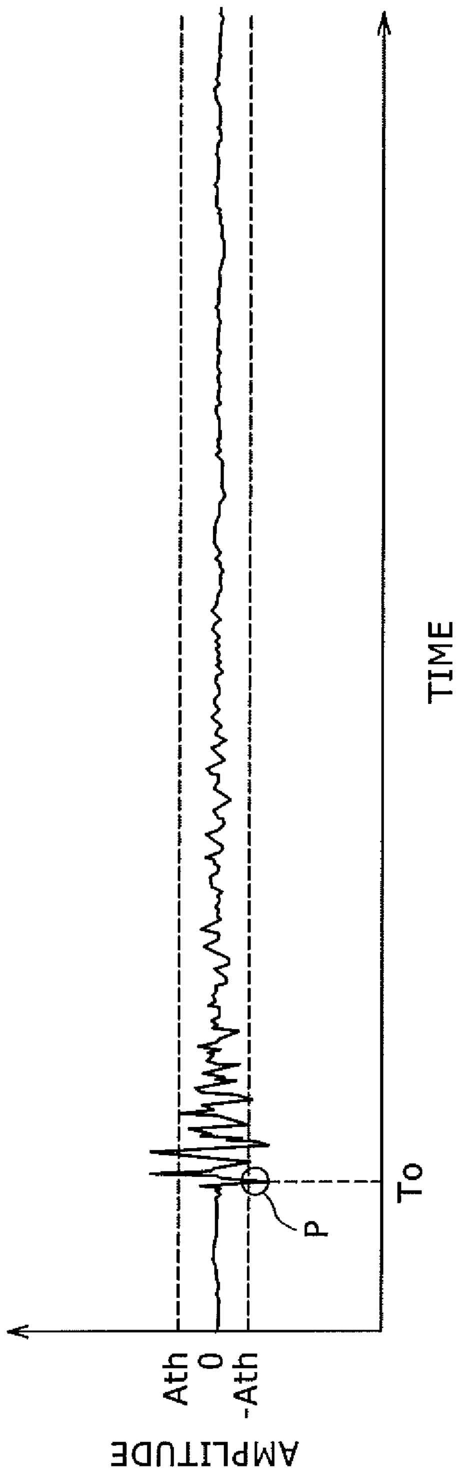
FIG. 9 is a waveform diagram showing a threshold value Ath of an audio signal according to the first embodiment.
Figure 10:
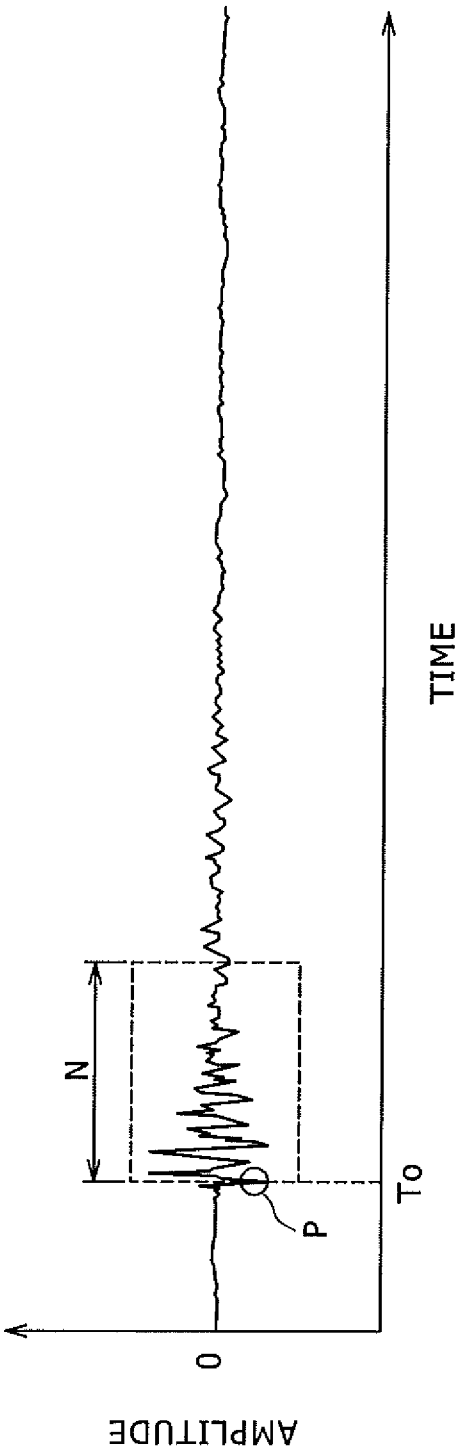
FIG. 10 is a waveform diagram showing the calculation range of signal energy E around a noise start point P in the audio signal according to the first embodiment.

The basic operation of the amplitude detector 22 according to the present embodiment will be described below with reference to FIG. 8 to FIG. 10. FIG. 8 is a flowchart showing the basic operation of the amplitude detector 22 according to the present embodiment. FIG. 9 is a waveform diagram showing the threshold value Ath of the audio signal according to the present embodiment. FIG. 10 is a waveform diagram showing the calculation range of the signal energy E around the noise start point P in the audio signal according to the present embodiment.

As shown in FIG. 8, first, the amplitude detector 22 acquires an audio signal obtained by audio recording from the external (e.g. data storage unit 30 or microphone) (step S10). This audio signal is continuously input to the amplitude detector 22.

Next, the amplitude detector 22 determines whether or not the absolute value of the amplitude value A (signal level) of the input audio signal has become larger than the threshold value Ath, and detects the position in the audio signal when the amplitude value A becomes larger than the threshold value Ath as the noise start point P (step S12). As shown in FIG. 9, when the amplitude value A of the audio signal becomes larger than the threshold value Ath, the rising edge of a noise signal arises and the position of this rising edge is determined as the noise start point P of the noise signal included in the audio signal. The threshold value Ath can be set based on e.g. a reference amplitude value Bth with which the auto gain control (AGC) function for the audio signal is enabled. For example, the value of 90% of the reference amplitude value Bth of the AGC function may be set as the threshold value Ath. This allows favorable detection of the rising edge of the noise signal.

In this manner, the noise detecting function by the noise detecting unit 20 is enabled when the absolute value of the amplitude value A of the audio signal surpasses the threshold value Ath, so that feature calculation processing by the frequency feature calculator 24 and the attenuation feature calculator 26 and noise determination processing by the noise determiner 28 are executed.

Subsequently, the amplitude detector 22 holds the base time T0 corresponding to the detected noise start point P in the storage part 222 and notifies the frequency feature calculator 24 and the attenuation feature calculator 26 of this base time T0 (step S14).

Furthermore, the amplitude detector 22 detects the input audio signal to thereby calculate the signal energy E around the noise start point P of the audio signal and output this signal energy E to the noise determiner 28 as the amplitude feature (step S16). For example, as shown in FIG. 10, the amplitude feature may be the energy of the audio signal in a predetermined range N from the noise start point P.

Figure 11:
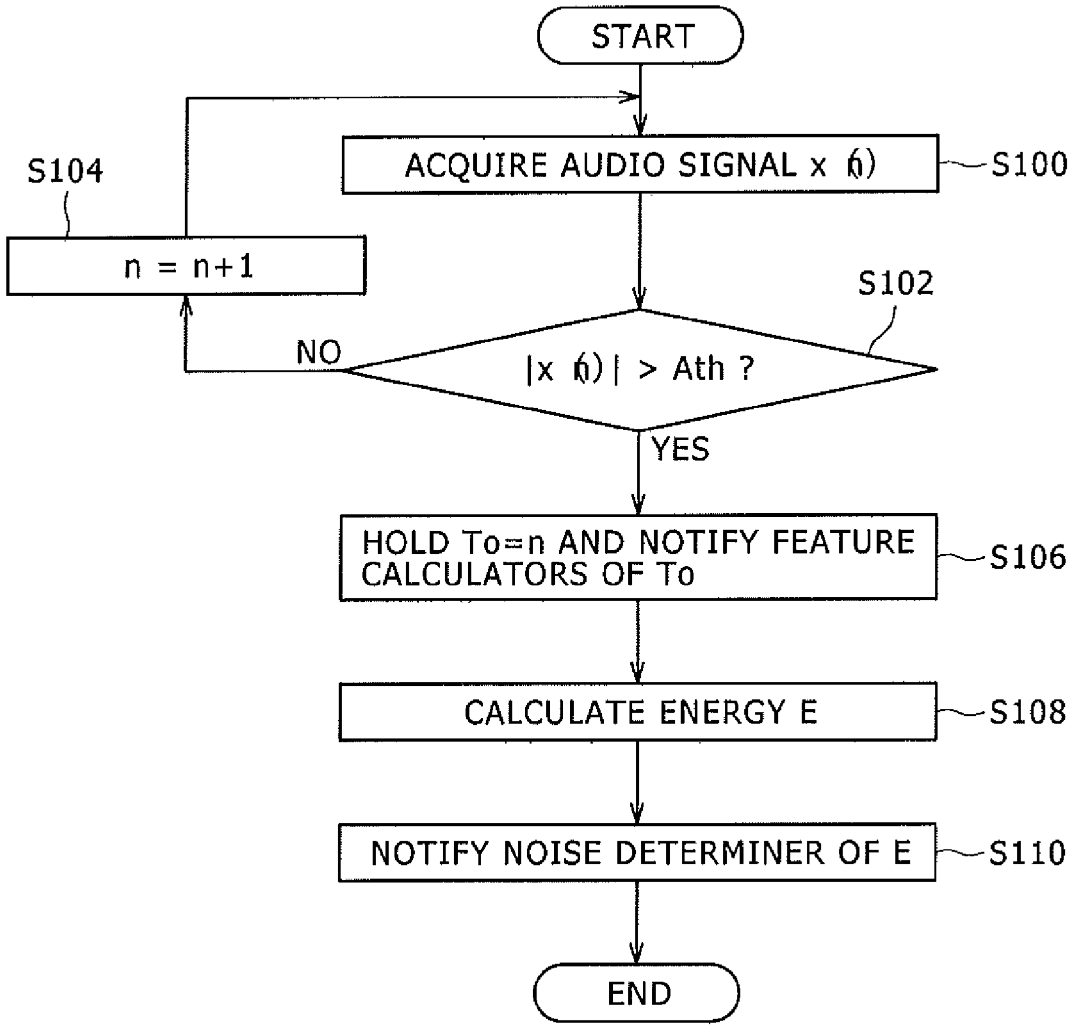
FIG. 11 is a flowchart showing the detailed operation of the amplitude detector according to the first embodiment.

Next, with reference to FIG. 11, the detailed operation of the amplitude detector 22 according to the present embodiment will be described below. FIG. 11 is a flowchart showing the detailed operation of the amplitude detector 22 according to the present embodiment. In FIG. 11, n denotes the sample number of the audio signal. x(n) denotes the amplitude value A of the audio signal at the sample number n. N denotes the number of samples in one frame of the audio signal.

As shown in FIG. 11, first, the amplitude detector 22 acquires an audio signal stored in the data storage unit 30 (step S100). Subsequently, the amplitude detector 22 determines whether or not the absolute value of the amplitude value A of the audio signal at the sample number n, i.e. the absolute value of x(n), is larger than the threshold value Ath (step S102). If the absolute value of x(n) is equal to or smaller than Ath, n=n+1 is set, i.e. the sample number is incremented by one (step S104). Through repetition of this processing, when the absolute value of x(n) has become larger than Ath, the amplitude detector 22 holds, in the memory, the sample number n of this timing as the parameter representing the base time T0 (i.e. noise start point P) and notifies the frequency feature calculator 24 and the attenuation feature calculator 26 of this base time T0 (step S106).

Subsequently, the amplitude detector 22 calculates the signal energy E immediately after the noise start point P in accordance with the following equation (1) (step S108). As shown in FIG. 10, the signal energy E around the noise start point P is the signal energy of the audio signal in the range from the noise start point P (base time T0) to a predetermined number N of samples. For example, N=128 can be set if the sampling frequency of the audio signal is 44.1 kHz. This can calculate the signal energy E around the rising edge of the noise signal.

[Expression 1]

$$E = \frac{1}{N} \sum_{m=T_0}^{T_0+N-1} x(m)^2 \tag{1}$$

Thereafter, the amplitude detector 22 notifies the noise determiner 28 of the signal energy E calculated in the step S108 as the amplitude feature for determining whether or not the noise signal of a keyboard sound or the like is present (step S110).

As described above, the amplitude detector 22 analyzes the amplitude value A of an audio signal to thereby detect the rising edge position (noise start point P) of a noise signal included in the audio signal and calculate the signal energy E on the basis of the noise start point P as the amplitude feature. This allows the noise determiner 28 to be described later to properly determine whether or not the noise signal of a keyboard sound or the like is present by using the amplitude feature of the rising timing of the noise signal.

[1.4. Details of Frequency Feature Calculator]

The configuration and operation of the frequency feature calculator 24 in the audio signal processing apparatus according to the present embodiment will be described below.

[1.4.1. Configuration of Frequency Feature Calculator]

Figure 12:
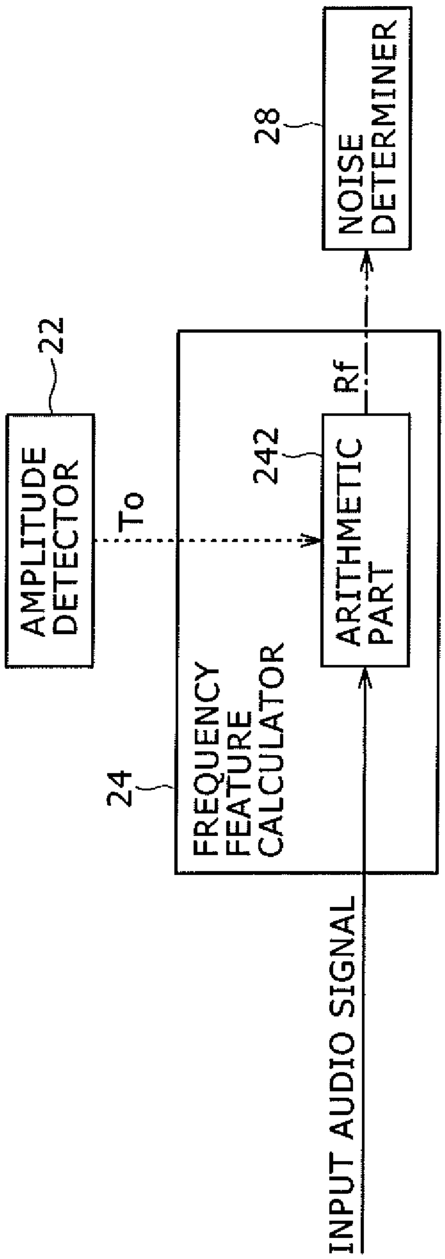
FIG. 12 is a block diagram showing the configuration of a frequency feature calculator according to the first embodiment.

First, with reference to FIG. 12, the configuration of the frequency feature calculator 24 according to the present embodiment will be described. FIG. 12 is a block diagram showing the configuration of the frequency feature calculator 24 according to the present embodiment.

As shown in FIG. 12, the frequency feature calculator 24 calculates the frequency feature Rf for obtaining the continuation leg of a noise signal included in an audio signal by utilizing the frequency characteristic of the audio signal. The frequency feature calculator 24 includes an arithmetic part 242 that executes processing of calculating the frequency feature Rf.

To the arithmetic part 242, a reproduced audio signal is input from the external. In addition, the arithmetic part 242 is notified of the base time T0 representing the noise start point P from the amplitude detector 22. Upon being notified of the base time T0, the arithmetic part 242 analyzes the audio signal to thereby calculate the frequency feature Rf representing the frequency characteristic of the audio signal and notify the noise determiner 28 of it. Specifically, the arithmetic part 242 analyzes the frequency characteristic of the audio signal in a predetermined leg after the noise start point P (base time T0) to thereby calculate the frequency feature Rf representing the degree of inclusion of high-frequency components equal to or higher than the reference frequency (e.g. 4 kHz) by the audio signal in this leg. This frequency feature Rf makes it possible to determine the duration of high-frequency components, which is a characteristic of the particular noise signal of a keyboard sound or the like.

[1.4.2. Basic Operation of Frequency Feature Calculator]

Figure 13:
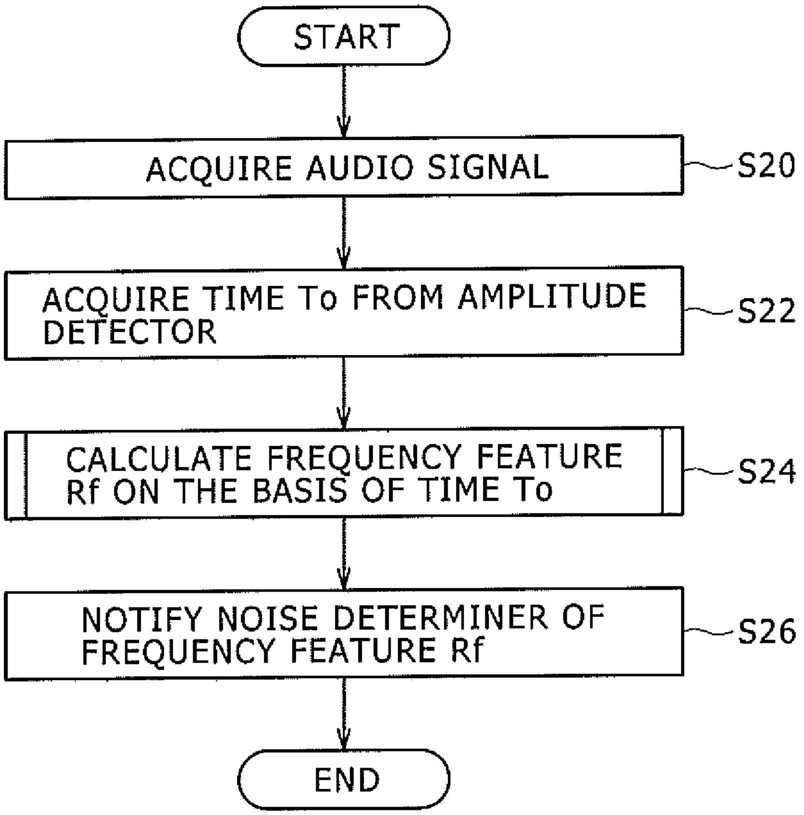
FIG. 13 is a flowchart showing the basic operation of the frequency feature calculator according to the first embodiment.
Figure 14A:
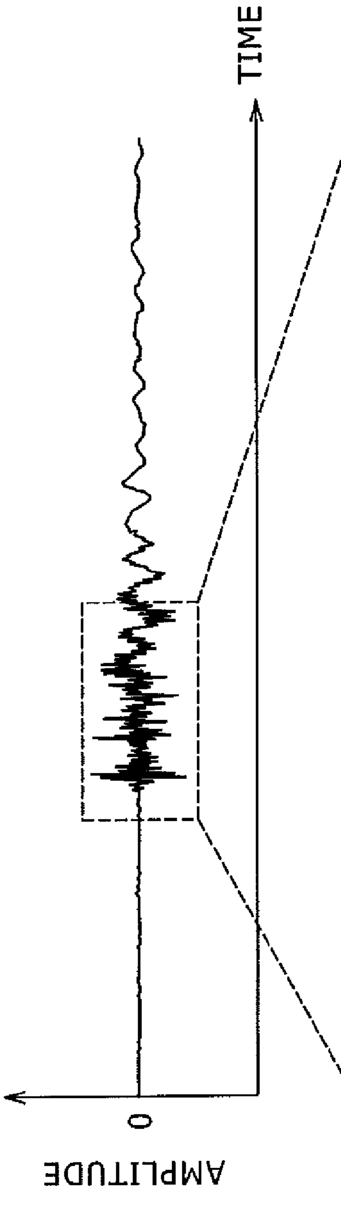
FIGS. 14A to 14C are waveform diagrams for explaining processing of calculating a frequency feature according to the first embodiment.
Figure 14B:
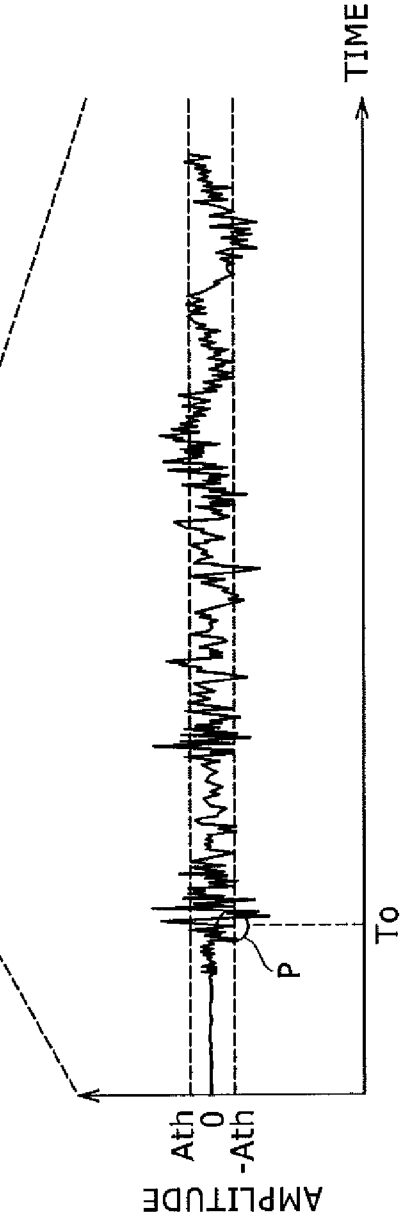

The basic operation of the frequency feature calculator 24 according to the present embodiment will be described below with reference to FIG. 13 through FIG. 14C. FIG. 13 is a flowchart showing the basic operation of the frequency feature calculator 24 according to the present embodiment. FIGS. 14A to 14B are waveform diagrams for explaining processing of calculating the frequency feature Rf according to the present embodiment.

As shown in FIG. 13, first, the frequency feature calculator 24 acquires an audio signal obtained by audio recording from the external (e.g. data storage unit 30 or microphone) (step S20). For example as shown in FIG. 14A, an audio signal including a noise signal is continuously input to the frequency feature calculator 24.

When the noise start point P in the audio signal is detected by the amplitude detector 22, the frequency feature calculator 24 acquires the base time T0 representing the noise start point P, at which the noise signal rises up, from the amplitude detector 22 (step S22). As shown in FIG. 14B, the timing when the noise signal in the audio signal surpasses the threshold value Ath is the noise start point P (base time T0).

Subsequently, the frequency feature calculator 24 analyzes the frequency characteristic of the audio signal in a predetermined leg on the basis of the noise start point P (base time T0) and calculates the frequency feature Rf around the noise start point P (step S24).

Figure 14C:
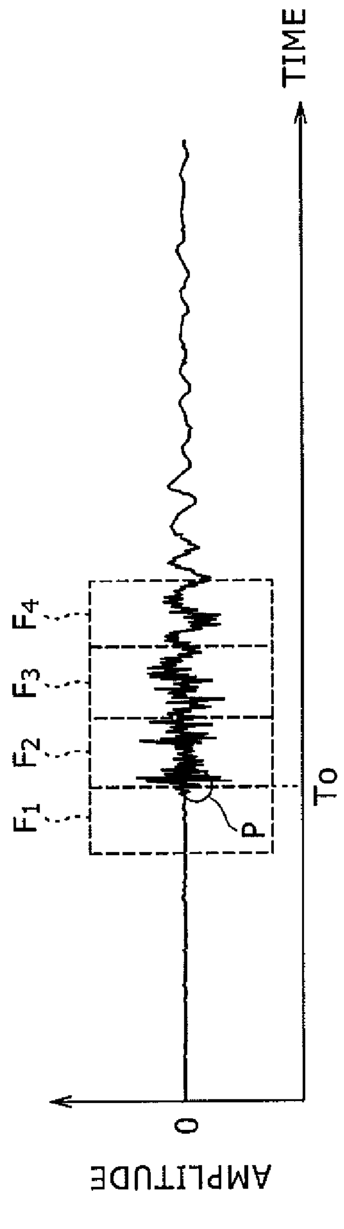

As shown in FIG. 14C, the frequency feature calculator 24 according to the present embodiment divides the audio signal into plural legs (frames) F1, F2, F3, . . . on the basis of the base time T0 and calculates the frequency feature Rf for each frame F. The respective frames F have the same time width and the same number N of samples. For example, the time width of one frame F is 3 msec and the number N of samples of one frame is 128. In the example of FIG. 14C, the first frame F1 disposed at the beginning on the time axis is set immediately before the noise start point P (base time T0) and the second frame F2 is set immediately after the noise start point P (base time T0). By dividing the audio signal into the plural frames F on the basis of the noise start point P and calculating the frequency feature Rf for each frame F in this manner, the leg of the existence of the noise signal (noise leg) can be detected with high accuracy.

[1.4.3. Specific Example of Frequency Feature]

Two kinds of specific examples of the frequency feature Rf will be described below. As the frequency feature Rf, e.g. (1) the number of zero-cross (zero-intersection) points or (2) the energy ratio of high-frequency components, which will be described below, can be used.

(1) Frequency Feature Rf by Use of the Number of Zero-Cross Points

Figure 15:
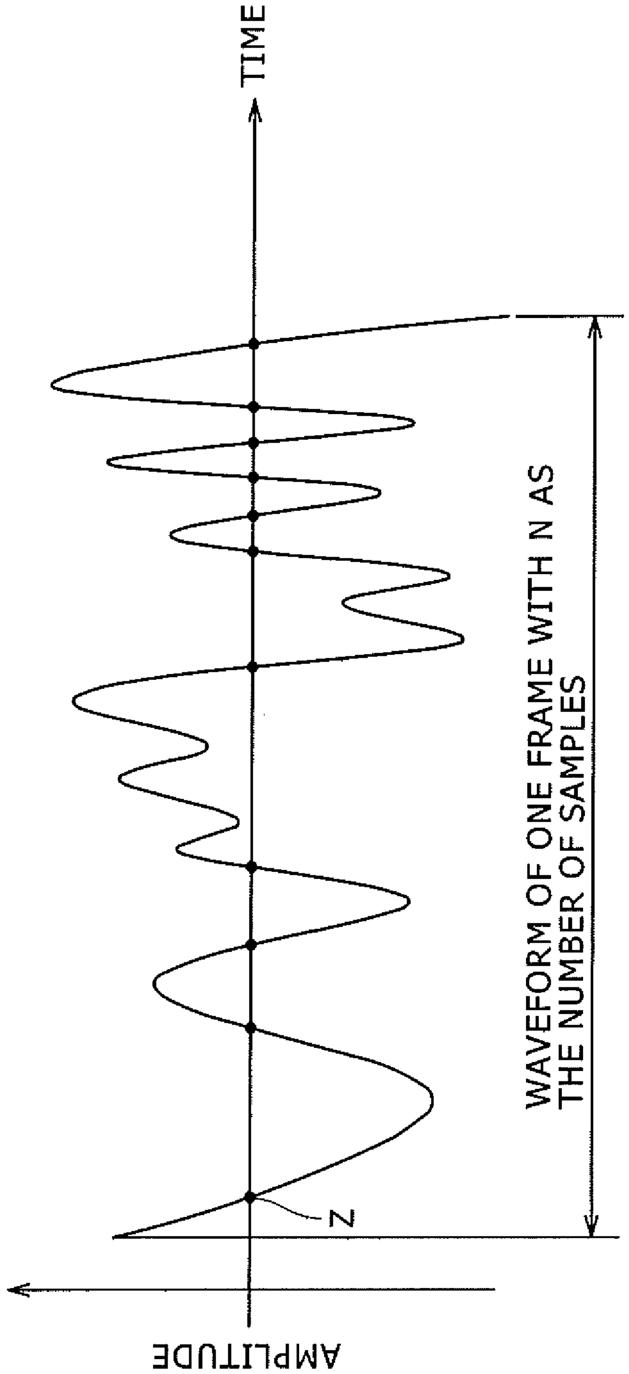
FIG. 15 is a waveform diagram for explaining a zero-cross point Z.

First, with reference to FIG. 15, an example in which a parameter representing the number cnt of zero-cross points Z of an audio signal is used as the frequency feature Rf will be described. FIG. 15 is a waveform diagram for explaining the zero-cross point Z.

As shown in FIG. 15, the zero-cross point Z indicates a point at which the signal value changes from a positive value to a negative value or from a negative value to a positive value in the time waveform of the audio signal. At the zero-cross point, the signal value of the audio signal is zero. When the number cnt of zero-cross points Z is larger, the audio signal has higher-frequency components.

The frequency feature calculator 24 can use the value obtained by dividing the number cnt of zero-cross points Z by the number N of samples in one frame F of the audio signal (=cnt/N) as the frequency feature Rf. A relationship of $0 \leq (cnt/N) < 1$ is satisfied. If the audio signal includes a signal of the Nyquist frequency (=sampling frequency/2), this value (cnt/N) is equal to one. If the audio signal includes only low-frequency components, this value (cnt/N) is close to zero.

As just described, the number cnt of zero-cross points Z is a parameter indicating the ratio of high-frequency components included in the audio signal. The frequency feature calculator 24 calculates the value (cnt/N) obtained by dividing the number cnt of zero-cross points Z by N for each of the frames F shown in FIG. 14C and can obtain the frequency feature Rf of each frame F.

(2) Frequency Feature Rf by Use of Energy Ratio of High-frequency Components

Figure 16A:
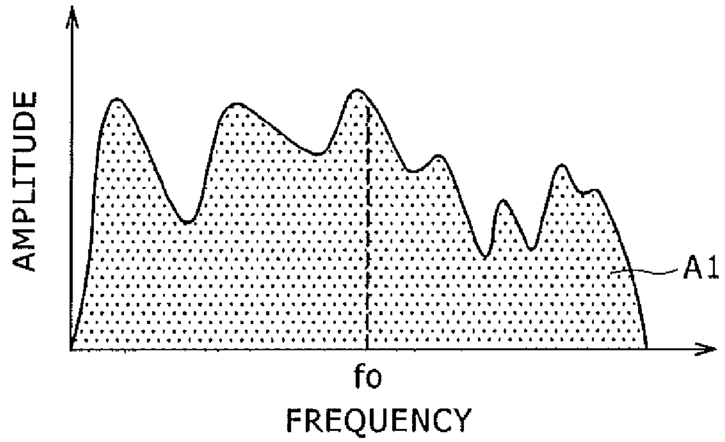
FIGS. 16A and 16B are waveform diagrams for explaining the energy ratio of high-frequency components.
Figure 16B:
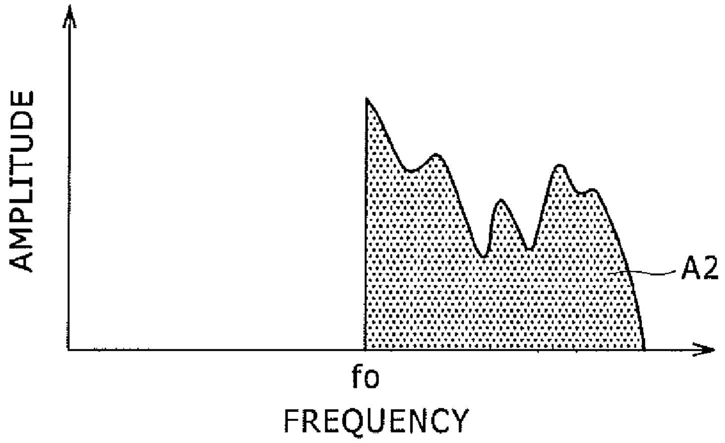

With reference to FIGS. 16A and 16B, a description will be made below about an example in which a parameter representing the ratio of high-frequency components equal to or higher than a reference frequency f0 to all frequency components of the audio signal (energy ratio of high-frequency components) is used as the frequency feature Rf. FIGS. 16A and 16B are waveform diagrams for explaining the energy ratio of high-frequency components.

As shown in FIGS. 16A and 16B, the energy ratio of high-frequency components is the ratio H of energy A2 of high-frequency components whose frequency is equal to or higher than the reference frequency f0 (see FIG. 16B) to energy A1 of all frequency components of the audio signal (see FIG. 16A) (H=area A2/area A1).

The frequency feature calculator 24 can use this ratio H as the frequency feature Rf. A relationship of $0 \leq H \leq 1$ is satisfied. If the audio signal includes more high-frequency components, H is closer to one. If the audio signal includes more low-frequency components, H is closer to zero.

As just described, the energy ratio H of high-frequency components in an audio signal serves as a parameter indicating the ratio of the high-frequency components included in the audio signal. The frequency feature calculator 24 calculates the energy ratio H of high-frequency components for each of the frames shown in FIG. 14C and can obtain the frequency feature Rf of each frame F.

[1.4.4. Frequency Characteristic of Keyboard Sound]

Figure 17:
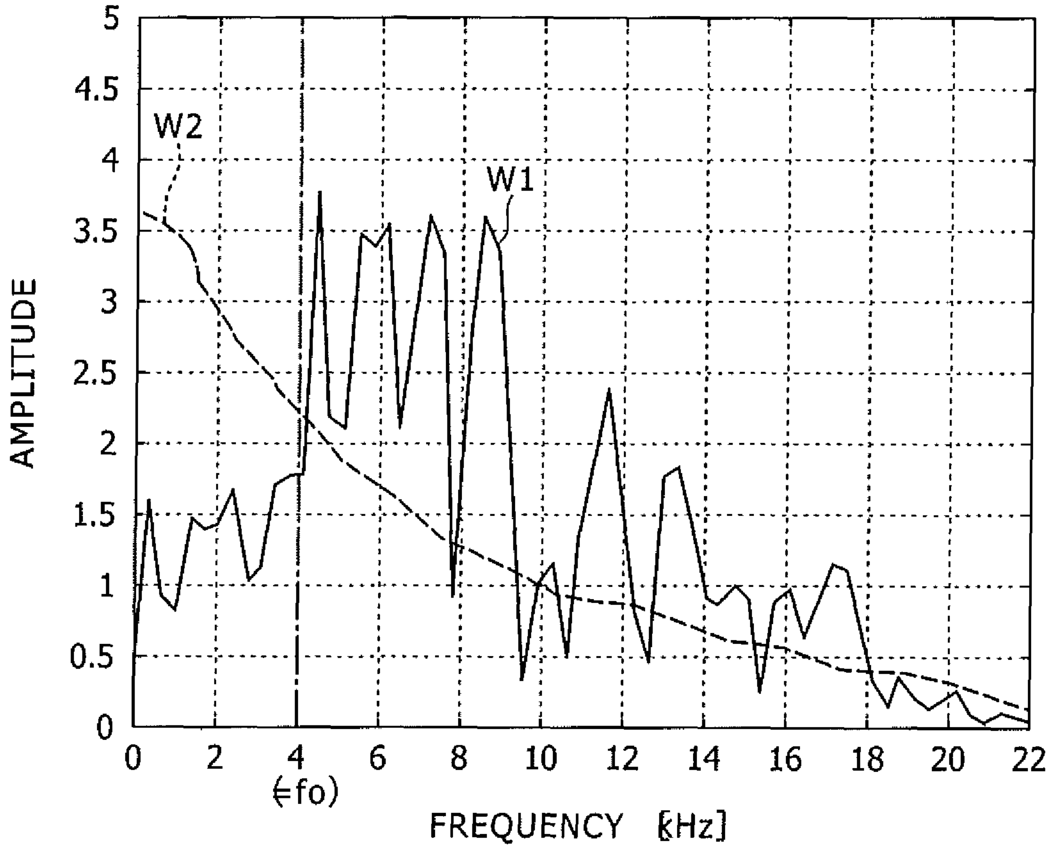
FIG. 17 is a waveform diagram showing the frequency characteristic of the keyboard sound.

The frequency characteristic of the particular noise signal of a keyboard sound or the like will be described below with reference to FIG. 17. FIG. 17 is a waveform diagram showing the frequency characteristic of a keyboard sound. In FIG. 17, a solid line waveform W1 indicates the frequency characteristic of the keyboard sound and a dotted line waveform W2 indicates the frequency characteristic of general noise of e.g. an air conditioner.

As shown in FIG. 17, it turns out that the keyboard sound (waveform W1) includes many high-frequency components equal to or higher than the reference frequency f0 (e.g. 4 kHz). In contrast, many of the audios recorded in a real environment (e.g. human voice and environmental sound) include more low-frequency components lower than the reference frequency f0 compared with high-frequency components. Also in the general noise (waveform W2), the amount of low-frequency components is larger than that of high-frequency components.

Therefore, the kind of noise can be classified by detecting the ratio between high-frequency components and low-frequency components in a recorded audio signal. For example, if the ratio of high-frequency components is high in part of a recorded audio signal, the part can be identified as particular noise such as a keyboard sound.

Furthermore, as shown in FIG. 17, the human voice includes many frequency components lower than 4 kHz in contrast to the keyboard sound, which includes many frequency components equal to or higher than 4 kHz. Therefore, to determine whether or not a keyboard sound is included in a recorded audio signal, it is preferable to analyze high-frequency components of the audio signal after cutting low-frequency components lower than e.g. 4 kHz from the audio signal by using a low-cut filter (high-pass filter).

[1.4.5. Detailed Operation of Frequency Feature Calculator]

The detailed operation of the frequency feature calculator 24 according to the present embodiment will be described below.

Figure 18:
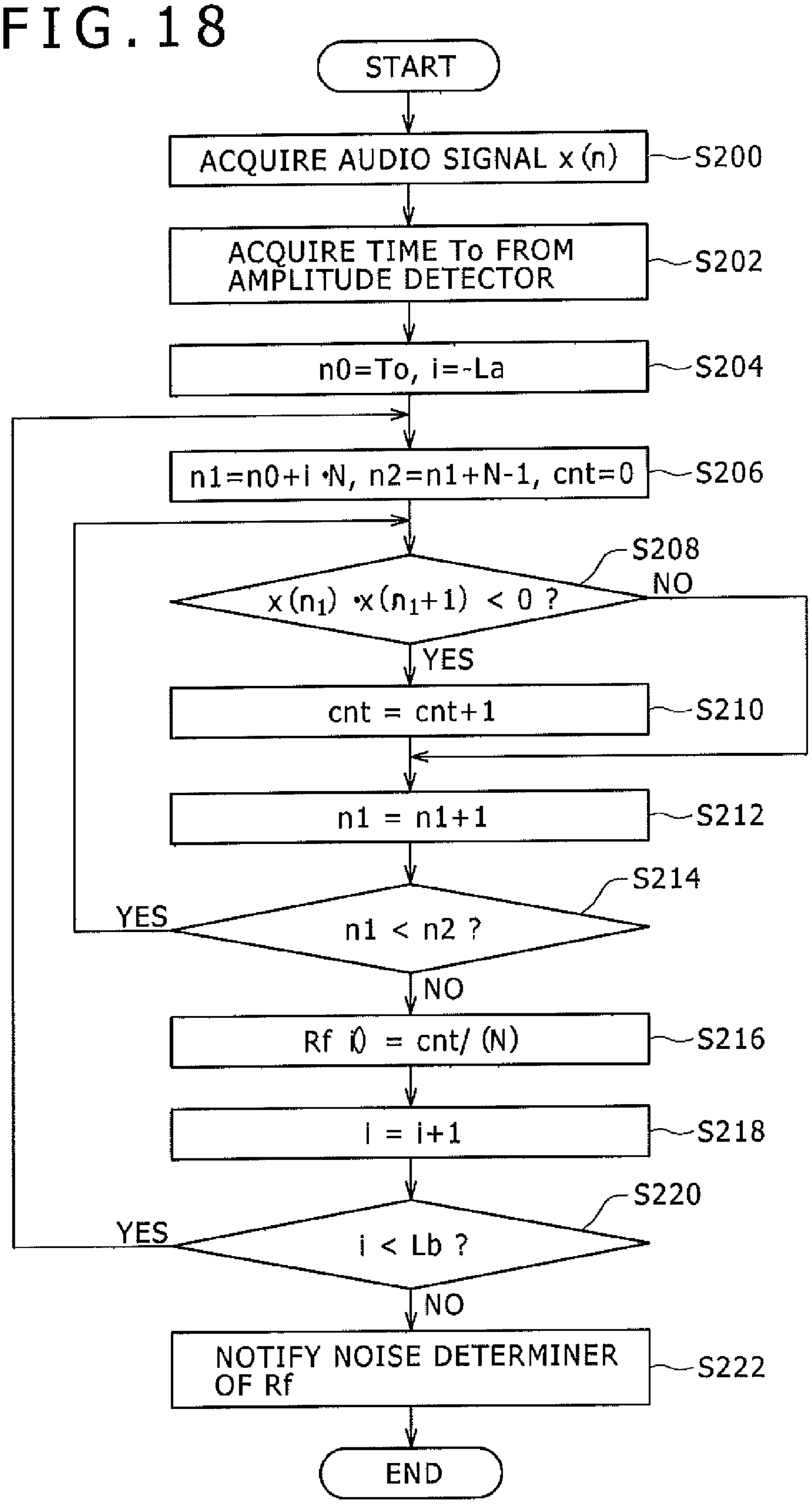
FIG. 18 is a flowchart showing operation of calculating a frequency feature Rf (the number cnt of zero-cross points Z) according to the first embodiment.

(1) Operation of Calculating Frequency Feature Rf by Using the Number cnt of Zero-cross Points Z First, with reference to FIG. 18, operation of calculating the frequency feature Rf by using the number cnt of zero-cross points Z according to the present embodiment will be described. FIG. 18 is a flowchart showing the operation of calculating the frequency feature Rf (the number cnt of zero-cross points Z) by the frequency feature calculator 24 according to the present embodiment.

As shown in FIG. 18, first, the frequency feature calculator 24 acquires an audio signal x(n) stored in the data storage unit 30 (step S200). Subsequently, the frequency feature calculator 24 acquires the base time T0 representing the noise start point P from the amplitude detector 22 (step S202). T0 is e.g. the sample number n of the audio signal x(n) when the noise start point P is detected.

Subsequently, the frequency feature calculator 24 divides the audio signal x(n) into plural frames F(i) (i=−La, −La+1, . . . , Lb−1, Lb) on the basis of the base time T0. Furthermore, the frequency feature calculator 24 calculates the number cnt of zero-cross points Z for each frame F and normalizes this cnt by using the number N of samples in one frame (steps S204 to S220). In this manner, the frequency feature Rf (=cnt/N) is calculated for each of the frames F(i) obtained by dividing the audio signal x(n).

Specifically, the frequency feature calculator 24 sets a parameter n0 to T0 and sets a parameter i to −La (step S204). La is the number of frames F set before the base time T0 and Lb is the number of frames F set after the base time T0.

Furthermore, the frequency feature calculator 24 sets a parameter n1 to n0+1*N and sets a parameter n2 to n1+N−1. Moreover, the frequency feature calculator 24 initializes the counter value cnt representing the number of zero-cross points Z to zero (step S206). n1 is the beginning sample number of the i-th frame F(i) of the audio signal and n2 is the trailing sample number of the i-th frame F(i) of the audio signal.

Subsequently, if the product of the amplitude value of the audio signal x(n1) of the sample number n1 and the amplitude value of the audio signal x(n1+1) of the sample number n1+1 is smaller than zero (step S208), the zero-cross point Z exists between both sample numbers and therefore the number cnt of zero-cross points Z is incremented by one (step S210). If the product is equal to or larger than zero (step S208), the zero-cross point Z does not exist and therefore cnt is not incremented.

Furthermore, the frequency feature calculator 24 adds one to the parameter n1 (step S212) and determines whether or not n1<n2 is satisfied (step S214). As a result, the processing of the above-described steps S208 to S212 is repeated about N pieces of n1 until n1=n2 is satisfied, and the number cnt of zero-cross points Z included in the i-th frame F(i) is counted.

Thereafter, the frequency feature calculator 24 sets the value obtained by dividing the number cnt of zero-cross points Z by the number n of samples as the frequency feature Rf(i) of the i-th frame F(i) (step S216). Furthermore, the frequency feature calculator 24 adds one to the parameter i (step S218) and determines whether or not i<Lb is satisfied (step S220). As a result, the processing of the above-described steps S206 to S218 is repeated about (La+Lb) pieces of i until i=Lb is satisfied, and the frequency feature Rf(i) is calculated for each of (La+Lb) frames F(i).

Thereafter, the frequency feature calculator 24 notifies the noise determiner 28 of the frequency features Rf(i) of (La+Lb) frames F(i), calculated in the above-described manner.

Figure 19:
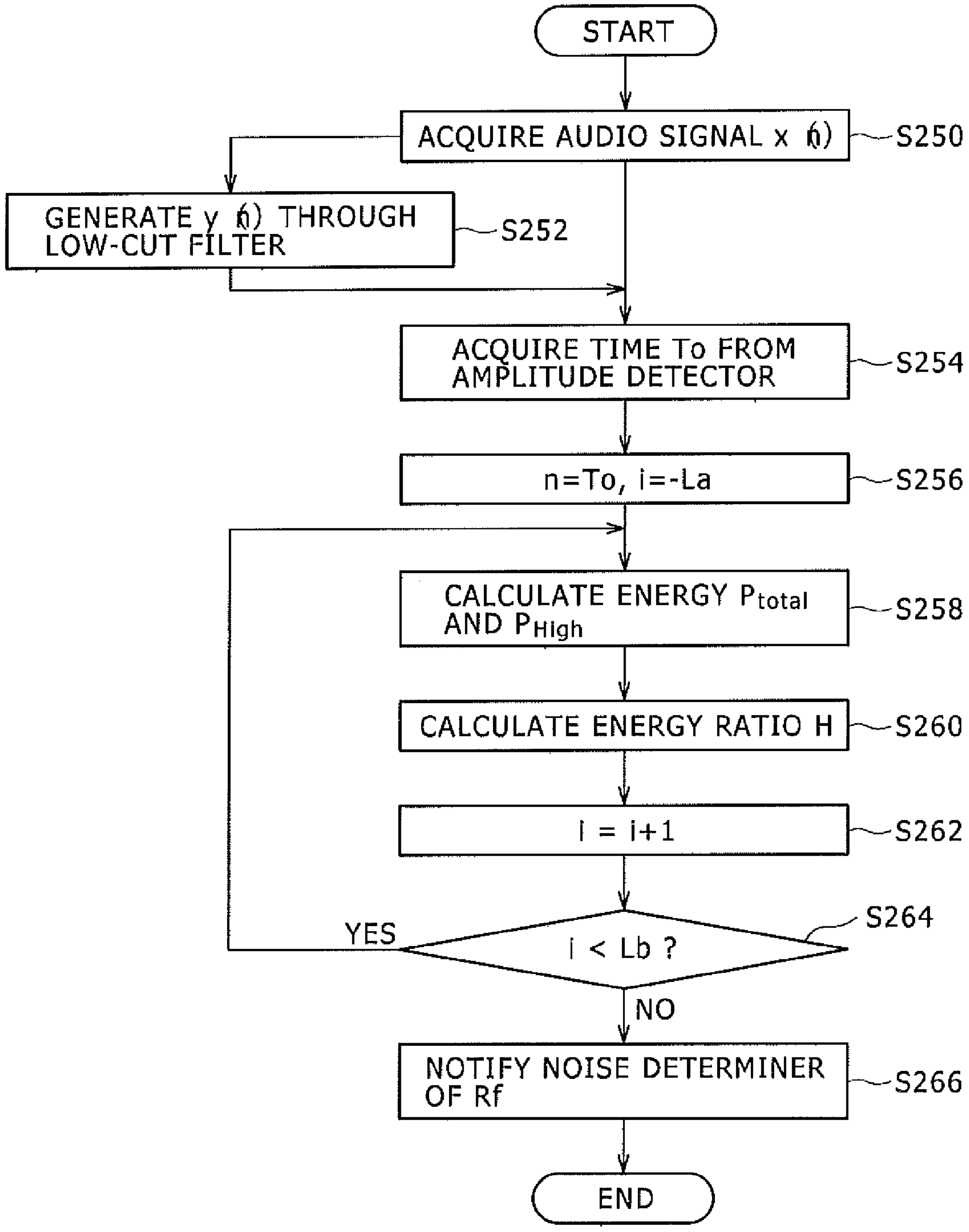
FIG. 19 is a flowchart showing operation of calculating the frequency feature Rf (energy ratio H of high-frequency components) according to the first embodiment.

(2) Operation of Calculating Frequency Feature Rf by Using Energy Ratio H of High-Frequency Components Next, with reference to FIG. 19, operation of calculating the frequency feature Rf by using the energy ratio H of high-frequency components according to the present embodiment will be described below. FIG. 19 is a flowchart showing the operation of calculating the frequency feature Rf (energy ratio H of high-frequency components) by the frequency feature calculator 24 according to the present embodiment.

As shown in FIG. 19, first, the frequency feature calculator 24 acquires an audio signal x(n) stored in the data storage unit 30 (step S250). Furthermore, the frequency feature calculator 24 makes the audio signal x(n) pass through a low-cut filter to thereby generate an audio signal y(n) including only high-frequency components (step S252). Specifically, the frequency feature calculator 24 removes low-frequency components equal to or lower than a predetermined frequency from the audio signal x(n) in accordance with the following equation (2) to thereby generate the audio signal y(n) including only high-frequency components.

[Expression 2]

$$y(n) = \sum_{h=0}^{p-1} F_{HPF}(h) \cdot x(n-h) \tag{2}$$

Subsequently, the frequency feature calculator 24 acquires the base time T0 representing the noise start point P from the amplitude detector 22 (step S254). T0 is e.g. the sample number n of the audio signal x(n) when the noise start point P is detected.

Subsequently, the frequency feature calculator 24 divides the audio signals x(n) and y(n) into the plural frames F(i) (i=−La, −La+1, . . . , Lb−1, Lb) on the basis of the base time T0 and calculates the energy ratio H of high-frequency components for each frame F (steps S256 to S264). In this manner, the frequency feature Rf is calculated for each of the frames F(i) obtained by dividing the audio signals x(n) and y(n).

Specifically, first, the frequency feature calculator 24 sets the parameter n to T0 and sets the parameter i to −La (step S256). La is the number of frames F set before the base time T0 and Lb is the number of frames F set after the base time T0.

Subsequently, the frequency feature calculator 24 calculates energy Ptotal of the audio signal x(n) including all frequency components and energy PHigh of the audio signal y(n) including only high-frequency components in accordance with the following equations (3) and (4) (step S258).

[Expression 3]

$$P_{total} = \frac{1}{N} \sum_{m=T_0+i\cdot N}^{T_0+(i+1)\cdot N-1} x(m)^2 \tag{3}$$

$$P_{High} = \frac{1}{N} \sum_{m=T_0+i\cdot N}^{T_0+(i+1)\cdot N-1} y(m)^2 \tag{4}$$

Moreover, the frequency feature calculator 24 divides the energy PHigh obtained by the step S258 by the energy Ptotal as shown by the following equation (5), to calculate the energy ratio H(i) of the i-th frame F(i) (step S260). The frequency feature calculator 24 sets thus obtained H(i) as the frequency feature Rf(i) of the i-th frame F(i).

[Expression 4]

$$H(i) = \frac{P_{High}}{P_{total}} \tag{5}$$

Thereafter, the frequency feature calculator 24 adds one to the parameter i (step S262) and determines whether or not i<Lb is satisfied (step S264). As a result, the processing of the above-described steps S258 to S262 is repeated about (La+Lb) pieces of i until i=Lb is satisfied, and H(i) is calculated as the frequency feature Rf(i) for each of (La+Lb) frames F(i).

Thereafter, the frequency feature calculator 24 notifies the noise determiner 28 of the frequency features Rf(i) of (La+Lb) frames F(i), calculated in the above-described manner.

As described above with use of FIG. 18 and FIG. 19, the frequency feature calculator 24 divides an audio signal into the plural frames F on the basis of the base time T0 and calculates the frequency feature Rf of each frame. This frequency feature Rf represents the ratio of high-frequency components included in the audio signal. This allows the noise determiner 28 to be described later to specify the leg in which a noise signal continuously including high-frequency components exists from the audio signal by using the frequency feature Rf and thus properly determine whether or not the particular noise signal of a keyboard sound or the like is present and the leg of the noise signal.

If the sampling frequency of the audio signal is 44.1 kHz, N=128, La=1, and Lb=1 can be set. In this example, three frames F are set before and after the base time T0. However, the way of the frame setting is not limited to this example. For example, it is possible that La is set to an integer equal to or larger than two and the plural frames F are set before the base time T0. Alternatively, it is also possible that La=0 is set and the frame F is set only after the base time T0. Furthermore alternatively, it is also possible that La is set to an integer equal to or larger than two and three or more frames F are set after the base time T0. When one or equal to or larger than two frame F is set after the base time T0, the frame F is so set as to cover the leg in which the noise signal of a keyboard sound exists depending on the duration of the keyboard sound as the detection subject.

Figure 20:
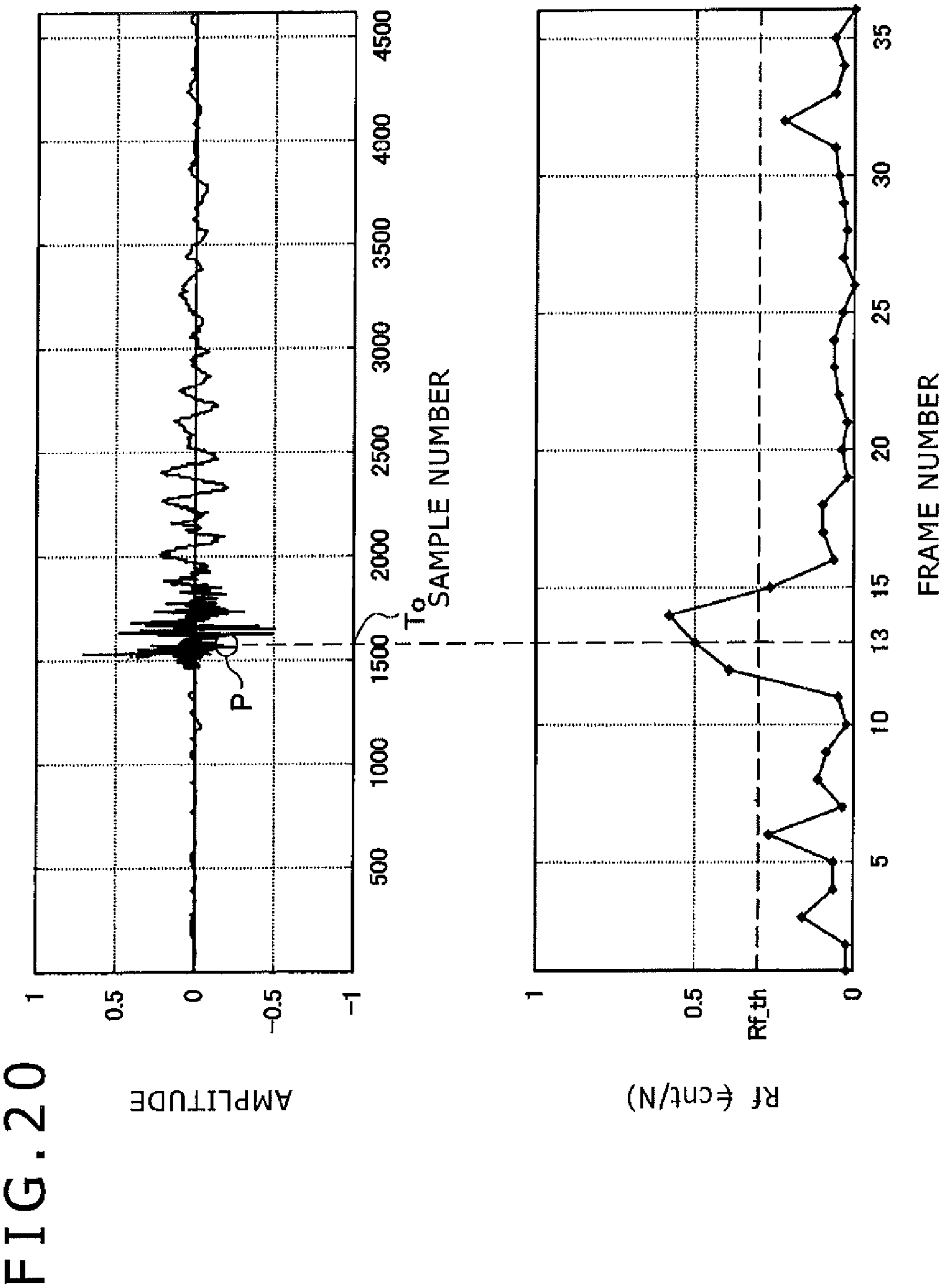
FIG. 20 is a graph showing an audio signal and the frequency feature Rf obtained by using the number cnt of zero-cross points Z according to the first embodiment.
Figure 21:
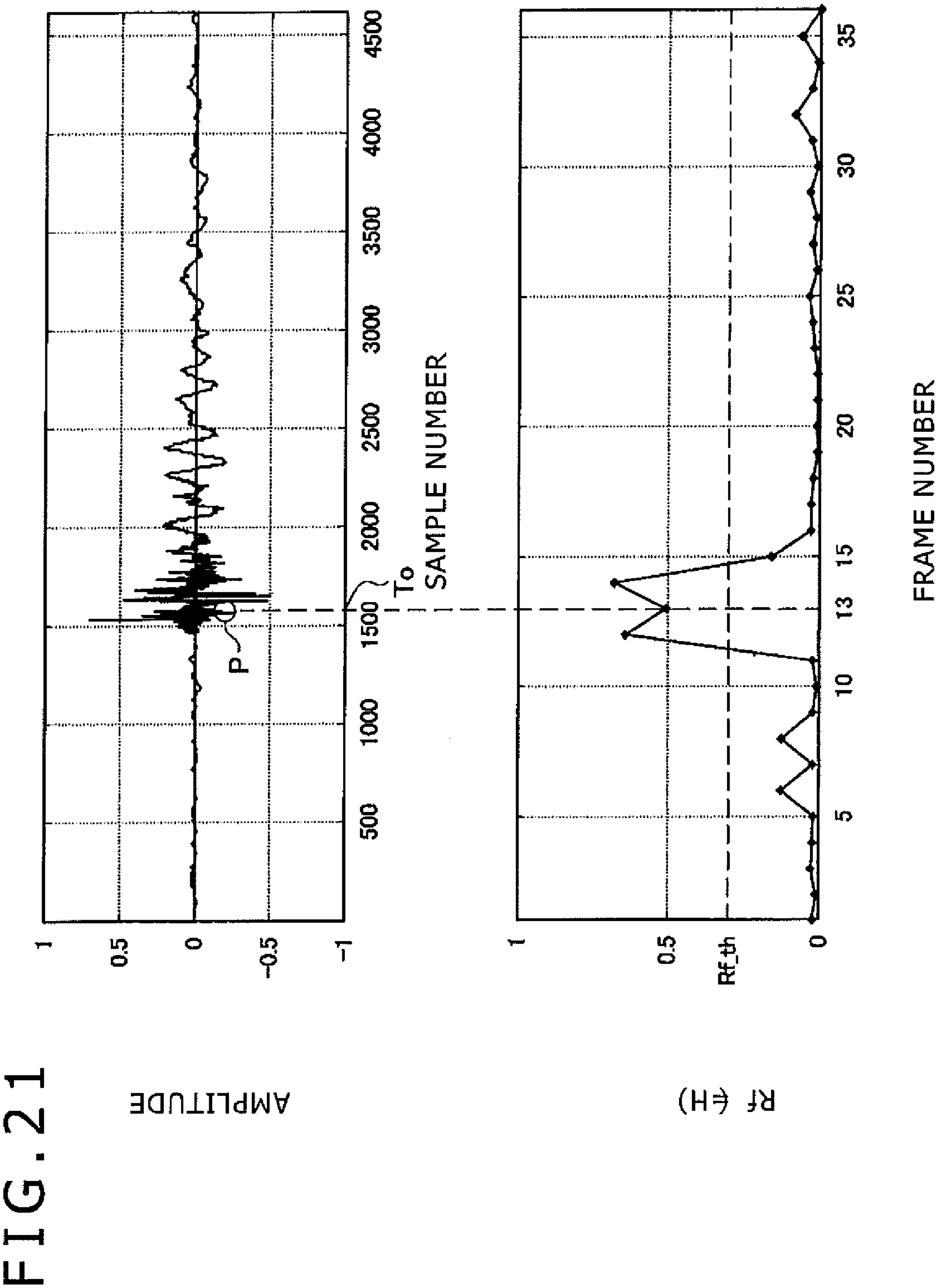
FIG. 21 is a graph showing the audio signal and the frequency feature Rf obtained by using the energy ratio H of high-frequency components according to the first embodiment.

Next, with reference to FIG. 20 and FIG. 21, specific examples of the frequency feature Rf calculated by the frequency feature calculator 24 will be described below. FIG. 20 is a graph showing an audio signal and the frequency feature Rf obtained by using the number cnt of zero-cross points Z according to the present embodiment. FIG. 21 is a graph showing the audio signal and the frequency feature Rf obtained by using the energy ratio H of high-frequency components according to the present embodiment.

FIG. 20 and FIG. 21 show results obtained by dividing the audio signal into the plural frames F each including 128 samples (the number N of samples=128) on the basis of the base time T0 and obtaining the frequency feature Rf of each frame F. In both of the case of using the number cnt of zero-cross points Z and the case of using the energy ratio H of high-frequency components, the base time T0 of the audio signal corresponds to the start point of the thirteenth frame F.

As shown in FIG. 20 and FIG. 21, it turns out that the frequency feature Rf has a larger value in roughly two frames around the base time T0 (thirteenth frame F) of the audio signal than in the other frames. Therefore, it can be said that, by using the frequency feature Rf as the criterion for determining the noise leg, the leg in which high-frequency components exist, i.e. the leg in which the particular noise signal of a keyboard sound or the like exists, can be properly estimated from the audio signal.

[1.5. Details of Attenuation Feature Calculator]

The configuration and operation of the attenuation feature calculator 26 in the audio signal processing apparatus 10 according to the present embodiment will be described below.

[1.5.1. Configuration of Attenuation Feature Calculator]

Figure 22:
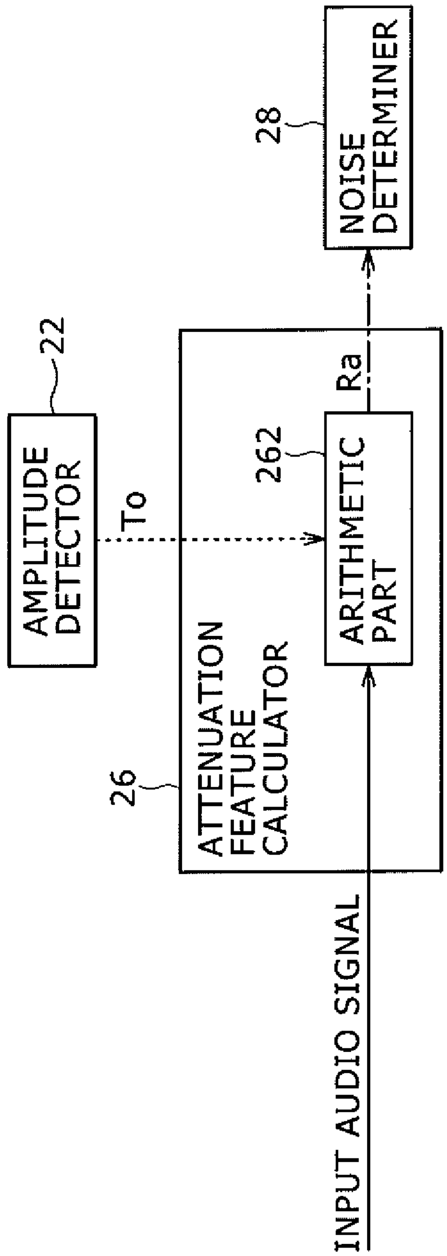
FIG. 22 is a block diagram showing the configuration of an attenuation feature calculator according to the first embodiment.

First, the configuration of the attenuation feature calculator 26 according to the present embodiment will be described with reference to FIG. 22. FIG. 22 is a block diagram showing the configuration of the attenuation feature calculator 26 according to the present embodiment.

As shown in FIG. 22, the attenuation feature calculator 26 calculates the attenuation feature Ra representing the attenuation state of a noise signal included in an audio signal by utilizing the energy attenuation of the audio signal. The attenuation feature calculator 26 includes an arithmetic part 262 that executes processing of calculating the attenuation feature Ra.

To the arithmetic part 262, a reproduced audio signal is input from the external. In addition, the arithmetic part 262 is notified of the base time T0 representing the noise start point P from the amplitude detector 22. Upon being notified of the base time T0, the arithmetic part 262 analyzes the audio signal to thereby calculate the attenuation feature Ra representing the attenuation state of the noise signal and notify the noise determiner 28 of it. Specifically, the arithmetic part 262 calculates the attenuation feature Ra by using the relationship between energy E1 of the audio signal around the noise start point P (base time T0) and energy E2 of the audio signal around the timing after the elapse of a predetermined time Td from the noise start point P. This attenuation feature Ra makes it possible to determine gradual attenuation, which is a characteristic of the particular noise signal of a keyboard sound or the like.

[1.5.2. Operation of Attenuation Feature Calculator]

Figure 23:
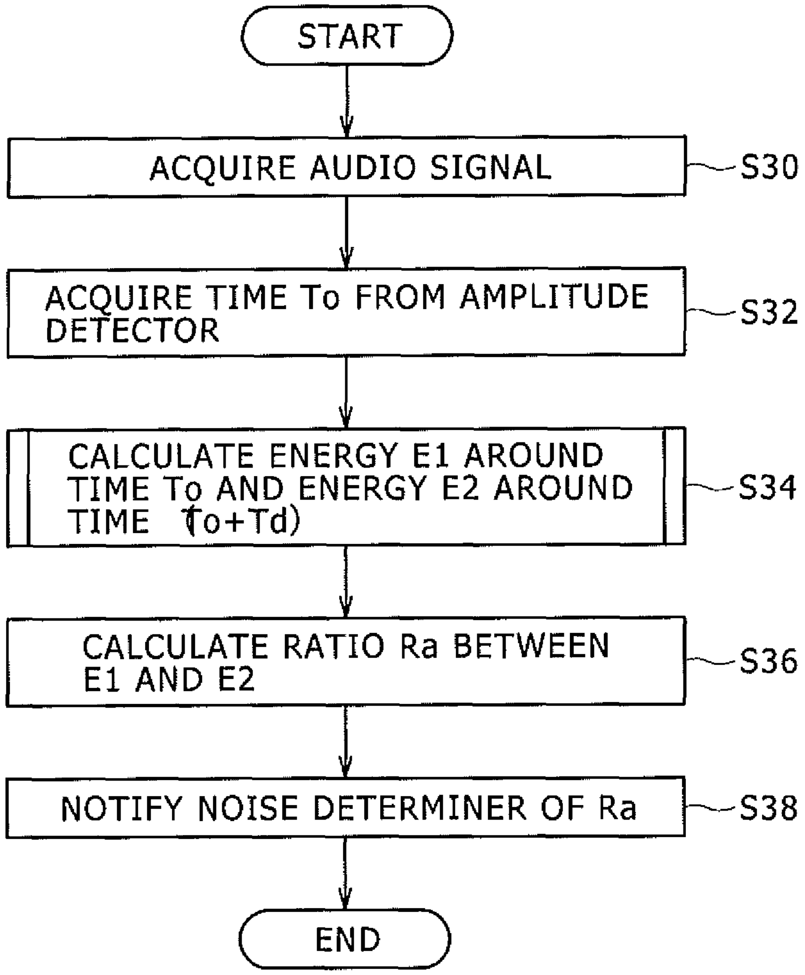
FIG. 23 is a flowchart showing the basic operation of the attenuation feature calculator according to the first embodiment.
Figure 24:
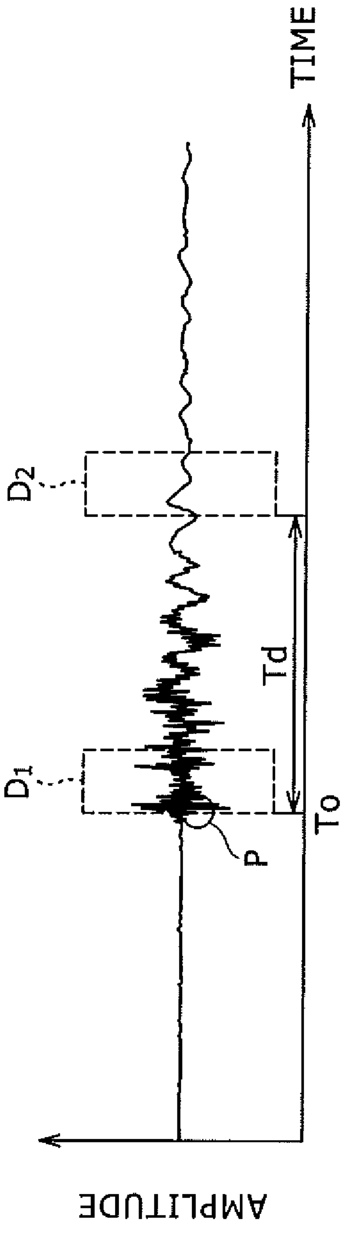
FIG. 24 is a waveform diagram for explaining processing of calculating an attenuation feature according to the first embodiment.

The basic operation of the attenuation feature calculator 26 according to the present embodiment will be described below with reference to FIG. 23 and FIG. 24. FIG. 23 is a flowchart showing the basic operation of the attenuation feature calculator 26 according to the present embodiment. FIG. 24 is a waveform diagram for explaining processing of calculating the attenuation feature according to the present embodiment.

As shown in FIG. 23, first, the attenuation feature calculator 26 acquires an audio signal obtained by audio recording from the external (e.g. data storage unit 30 or microphone) (step S30). For example, as shown in FIG. 24, an audio signal including a noise signal is continuously input to the attenuation feature calculator 26.

When the noise start point P in the audio signal is detected by the amplitude detector 22, the attenuation feature calculator 26 acquires the base time T0 representing the noise start point P, at which the noise signal rises up, from the amplitude detector 22 (step S32).

Subsequently, as shown in FIG. 24, the attenuation feature calculator 26 calculates the energy E1 of the audio signal in a first leg D1 immediately after the base time T0 (noise start point P) and the energy E2 of the audio signal in a second leg D2 after the elapse of the predetermined time Td from the base time T0 (step S34). Furthermore, the attenuation feature calculator 26 calculates the ratio of E2 to E1 obtained in the step S34 (=E2/E1) as the attenuation feature Ra (step S36).

As shown in FIG. 24, the width of the first leg D1 immediately after the base time T0 is the same as that of the second leg D2 after the elapse of the predetermined time Td. The time interval Td between the first leg D1 and the second leg D2 may be set to a proper fixed value dependent on the duration of a keyboard sound or the like as the detection subject in advance.

Figure 25:
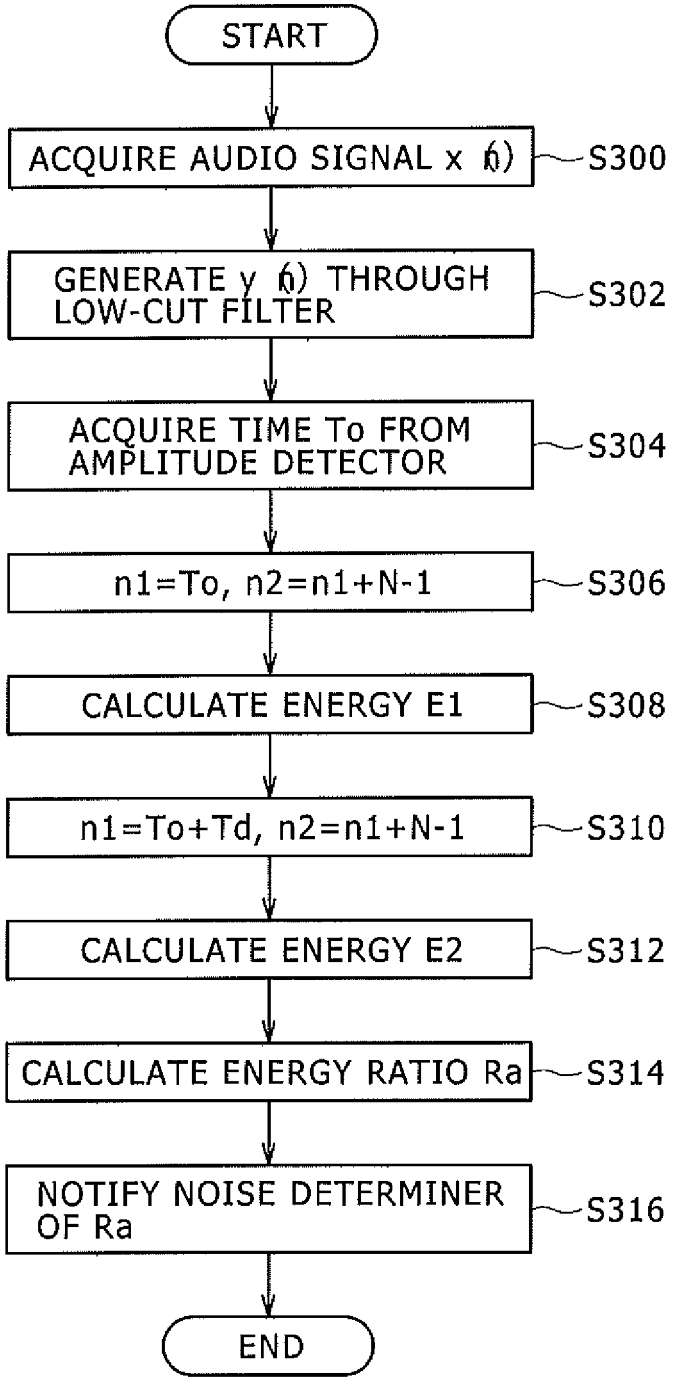
FIG. 25 is a flowchart showing the detailed operation of the attenuation feature calculator according to the first embodiment.

Next, with reference to FIG. 25, the detailed operation of the attenuation feature calculator 26 according to the present embodiment will be described below. FIG. 25 is a flowchart showing the detailed operation of the attenuation feature calculator 26 according to the present embodiment.

As shown in FIG. 25, first, the attenuation feature calculator 26 acquires an audio signal x(n) stored in the data storage unit 30 (step S300).

Subsequently, the attenuation feature calculator 26 makes the audio signal x(n) pass through a low-cut filter to thereby generate an audio signal y(n) including only high-frequency components (step S302). Specifically, the attenuation feature calculator 26 removes low-frequency components equal to or lower than a predetermined frequency (e.g. 300 Hz) from the audio signal x(n) in accordance with the following equation (2) to thereby generate the audio signal y(n) including only high-frequency components.

Subsequently, the attenuation feature calculator 26 acquires the base time T0 representing the noise start point P from the amplitude detector 22 (step S304). T0 is e.g. the sample number n of the audio signal x(n) when the noise start point P is detected.

Subsequently, the attenuation feature calculator 26 sets the parameter n1 to T0 and sets the parameter n2 to n1+N−1 (step S306). Furthermore, the attenuation feature calculator 26 calculates the energy E1 of the first leg D1 of the audio signal y(n) in accordance with the following equation (6) (step S308). As shown in FIG. 24, the first leg D1 is the leg immediately after the base time T0 (noise start point P).

[Expression 5]

$$E_1 = \frac{1}{N}\sum_{m=n1}^{n2} y(m)^2 \qquad (6)$$

Subsequently, the attenuation feature calculator 26 sets the parameter n1 to T0+Td and sets the parameter n2 to n1+N−1 again (step S310). Furthermore, the attenuation feature calculator 26 calculates the energy E2 of the second leg D2 of the audio signal y(n) in accordance with the following equation (7) (step S312). As shown in FIG. 24, the second leg D2 is the leg after the elapse of the predetermined time Td from the base time T0.

[Expression 6]

$$E_2 = \frac{1}{N}\sum_{m=n1}^{n2} y(m)^2 \tag{7}$$

Moreover, the attenuation feature calculator 26 calculates the ratio (energy ratio) between the energy E2 obtained in the step S312 and the energy E1 obtained in the step S308 as the attenuation feature Ra (step S314). For example, the attenuation feature calculator 26 obtains the attenuation feature Ra by calculating the logarithm of the value obtained by dividing the energy E2 by the energy E1 as shown by the following equation (8).

[Expression 7]

$$R_a = \log_{10}\left(\frac{E_2}{E_1}\right) \tag{8}$$

Thereafter, the attenuation feature calculator 26 notifies the noise determiner 28 of the attenuation feature Ra calculated in the above-described manner (step S316).

As described above, the attenuation feature calculator 26 calculates the attenuation feature Ra by using the ratio between the energy E1 of an audio signal around the base time T0 and the energy E2 of the audio signal around the timing after the elapse of the predetermined time Td from the base time T0. This attenuation feature Ra represents the amount of attenuation of a noise signal on the basis of the rising edge timing (base time T0) of the noise signal. This allows the noise determiner 28 to be described later to determine the attenuation state of the noise signal in the audio signal by using the attenuation feature Ra and thus properly determine the noise end point Q of the particular noise signal of a keyboard sound or the like.

In the processing of FIG. 25, the audio signal y(n) obtained by removing low-frequency components from the audio signal x(n) by using a low-cut filter is generated as preprocessing for the calculation of the energy E1 and E2 (S302), and the attenuation feature Ra is calculated by using the audio signal y(n). Due to this preprocessing, the attenuation feature Ra of high-frequency components included in the audio signal can be calculated after reduction in the influence of low-frequency components (equal to or lower than e.g. 300 kHz), such as the vibration 8 transmitted in the desk 3 shown in FIG. 1, in the audio signal x(n). Thus, the attenuation feature Ra corresponding to particular noise such as a keyboard sound as the detection subject can be properly detected. The present inventors examined an actual recorded audio signal. As a result, it has proved that it is effective to cut signal components lower than about 300 kHz to suppress the vibration 8 in the desk 3.

In the above-described operation, Ra is obtained on the basis of the energy E1 of the leg immediately after the base time T0. However, the following operation is also possible. Specifically, an audio signal is divided into the plural frames F on the basis of the base time T0 (see FIG. 14C). In addition, on the basis of the energy E1 of a respective one of the frames F, the ratio of the energy E2 of the frame after Td from the respective one of the frames F (=E2/E1) is obtained. Thereby, attenuation features Ra(1), Ra(2), Ra(3), . . . on the basis of the respective frames F(1), F(2), F(3), . . . can be obtained.

Figure 26A:
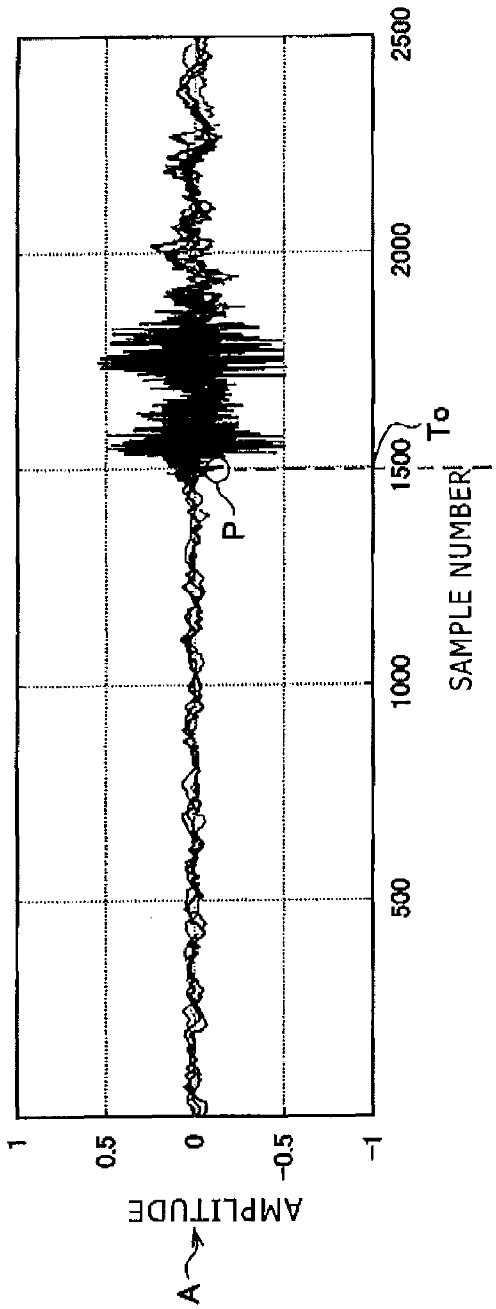
FIGS. 26A and 26B are graphs showing an audio signal and an attenuation feature Ra according to the first embodiment.
Figure 26B:
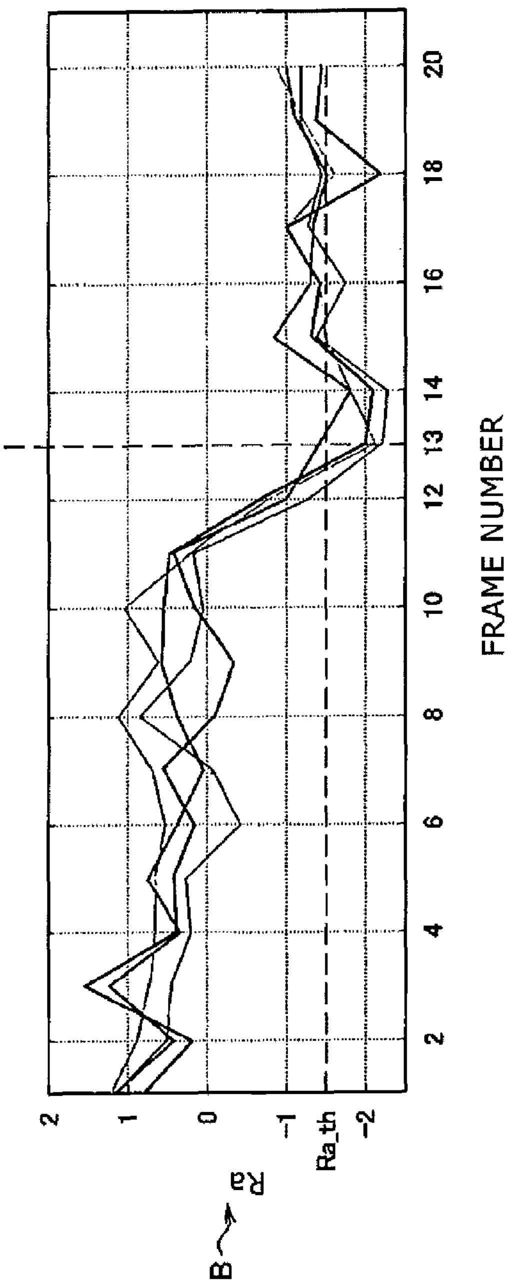

Next, with reference to FIGS. 26A and 26B, a specific example of the attenuation feature Ra calculated by the attenuation feature calculator 26 will be described below. FIGS. 26A and 26B are graphs showing an audio signal and the attenuation feature Ra according to the present embodiment.

FIGS. 26A and 26B show a result obtained by dividing the audio signal into the plural frames F each including 128 samples (the number N of samples=128) on the basis of the base time T0 and calculating the energy E1 of a respective one of the frames F and the energy E2 of the frame after Td from the respective one of the frames F to obtain the above-described attenuation feature Ra for each frame F. In FIGS. 26A and 26B, about four kinds of audio signals including different keyboard sounds, their waveforms and attenuation features Ra are shown in an overlapped manner. The base time T0 of each audio signal corresponds to the start point of the thirteenth frame F. The above-described Td represents the sample point after the elapse of a predetermined time from T0 (noise start point P). As the value of this Td, e.g. 1900 (samples) was used.

As shown in FIGS. 26A and 26B, in the leg before the base time T0 as the noise start point P, a noise signal is not included in the audio signal and therefore the attenuation feature Ra of the frames from the first frame F to the eleventh frame F stably remain at comparatively-high values. Therefore, it turns out that the energy of the audio signal hardly attenuates in this leg. In contrast, a noise signal is included in the leg after the base time T0. This noise signal keeps high amplitude values over a predetermined time Tth continuously and thereafter gradually attenuates. Therefore, the attenuation feature Ra of the twelfth, thirteenth, and fourteenth frames F around the base time T0 suddenly decreases to the minimum value (e.g. about −2). On the other hand, the attenuation feature Ra of the fifteenth and subsequent frames F stably remains at values (e.g. about −1.5) slightly larger than this minimum value.

As described above, due to setting of Td to a proper value dependent on the duration of the noise signal, the attenuation feature Ra of the frames (twelfth to fourteenth frames) around the input timing (base time T0) of the noise signal is lower than the attenuation feature Ra of the leg before the input of the noise signal (eleventh and previous frames) and the leg after the elapse of a certain amount of time from the input of the noise signal (fifteenth and subsequent frames). Therefore, it is possible to estimate whether or not the noise signal included in the audio signal shows envisaged attenuation based on the change in the attenuation feature Ra. Thus, particular noise such as a keyboard sound as the detection target can be properly detected by using the attenuation feature Ra.

[1.6. Details of Noise Determiner]

The configuration and operation of the noise determiner 28 in the audio signal processing apparatus 10 according to the present embodiment will be described below.

[1.6.1. Configuration of Noise Determiner]

Figure 27:
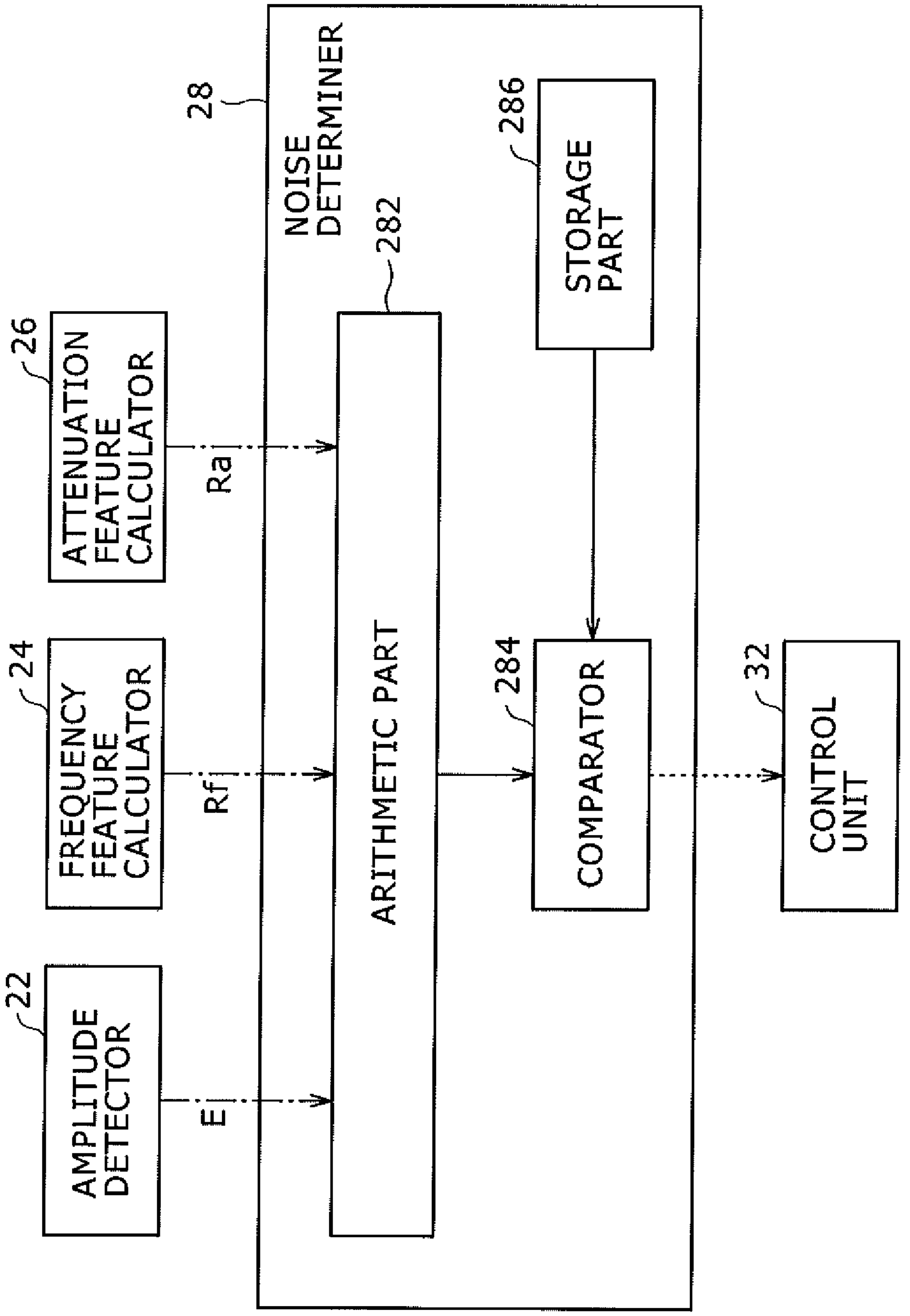
FIG. 27 is a block diagram showing the configuration of a noise determiner according to the first embodiment.

First, with reference to FIG. 27, the configuration of the noise determiner 28 according to the present embodiment will be described. FIG. 27 is a block diagram showing the configuration of the noise determiner 28 according to the present embodiment.

As shown in FIG. 27, the noise determiner 28 includes an arithmetic part 282, a comparator 284, and a storage part 286.

To the arithmetic part 282, the amplitude feature E, the frequency feature Rf, and the attenuation feature Ra are input from the amplitude detector 22, the frequency feature calculator 24, and the attenuation feature calculator 26, respectively. The arithmetic part 282 calculates an evaluation value v representing whether or not the particular noise signal of a keyboard sound or the like is included in the audio signal based on the amplitude feature E, the frequency feature Rf, and the attenuation feature Ra.

The comparator 284 determines whether or not the particular noise signal of a keyboard sound or the like is included in the audio signal based on this evaluation value v. The storage part 286 stores the threshold value of the evaluation value v set in advance depending on the noise signal as the detection subject. The comparator 284 compares the threshold value read out from the storage part 286 with the evaluation value v input from the arithmetic part 282. Furthermore, the comparator 284 determines whether or not a particular noise signal is included in the audio signal based on the comparison result. If a noise signal is included, the comparator 284 determines the leg from the noise start point P of the noise signal to the noise end point Q (noise leg). The comparator 284 outputs the determination result (whether or not noise signal is present, noise leg) to the control unit 32 and the noise reducing unit 34.

[1.6.2. Operation of Noise Determiner]

Figure 28:
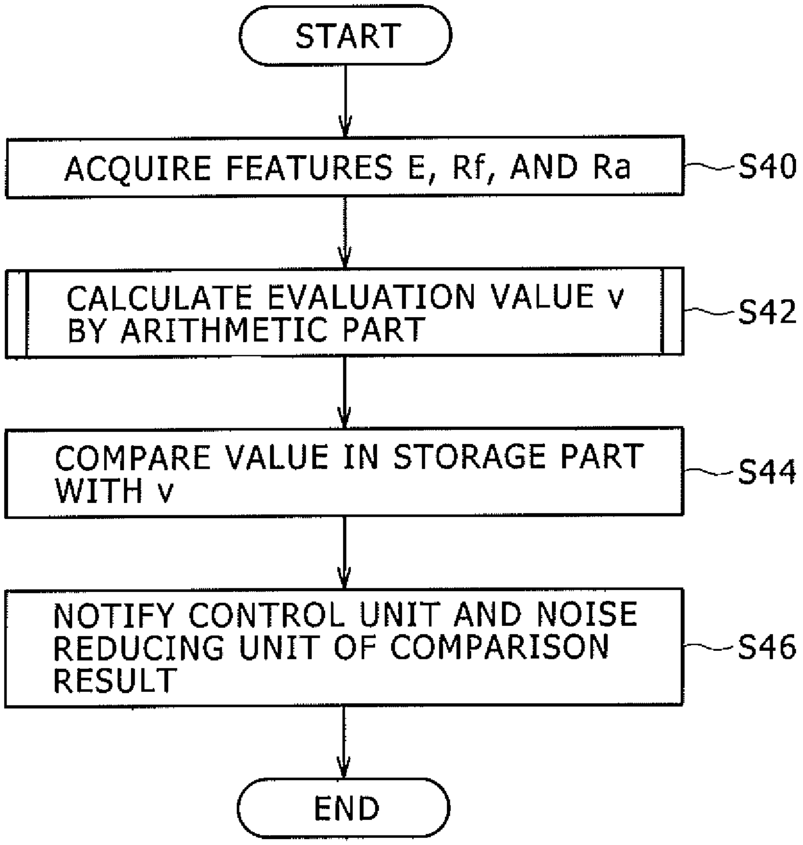
FIG. 28 is a flowchart showing the basic operation of the noise determiner according to the first embodiment.

The basic operation of the noise determiner 28 according to the present embodiment will be described below with reference to FIG. 28. FIG. 28 is a flowchart showing the basic operation of the noise determiner 28 according to the present embodiment.

As shown in FIG. 28, first, the noise determiner 28 acquires the features E, Rf, and Ra from the amplitude detector 22, the frequency feature calculator 24, and the attenuation feature calculator 26, respectively (step S40). Subsequently, the noise determiner 28 performs arithmetic operation with the amplitude feature E, the frequency feature Rf, and the attenuation feature Ra by the arithmetic part 282 to calculate the evaluation value v (step S42). Moreover, the noise determiner 28 compares the calculated evaluation value v with the threshold value stored in the storage part 286 (step S44). Thereafter, the noise determiner 28 determines whether or not a noise signal is present and the noise leg based on the comparison result of the step S44 and notifies the control unit 32 and the noise reducing unit 34 of the determination result (whether or not noise signal is present, noise leg) (step S46).

In the above-described configuration example of the noise determiner 28, noise is determined by calculating one evaluation value v obtained by synthesizing the amplitude feature E, the frequency feature Rf, and the attenuation feature Ra and comparing this evaluation value v with the threshold value. However, the way of the determination is not limited to this example. Noise may be determined by individually comparing the amplitude feature E, the frequency feature Rf, and the attenuation feature Ra with threshold values.

Figure 29:
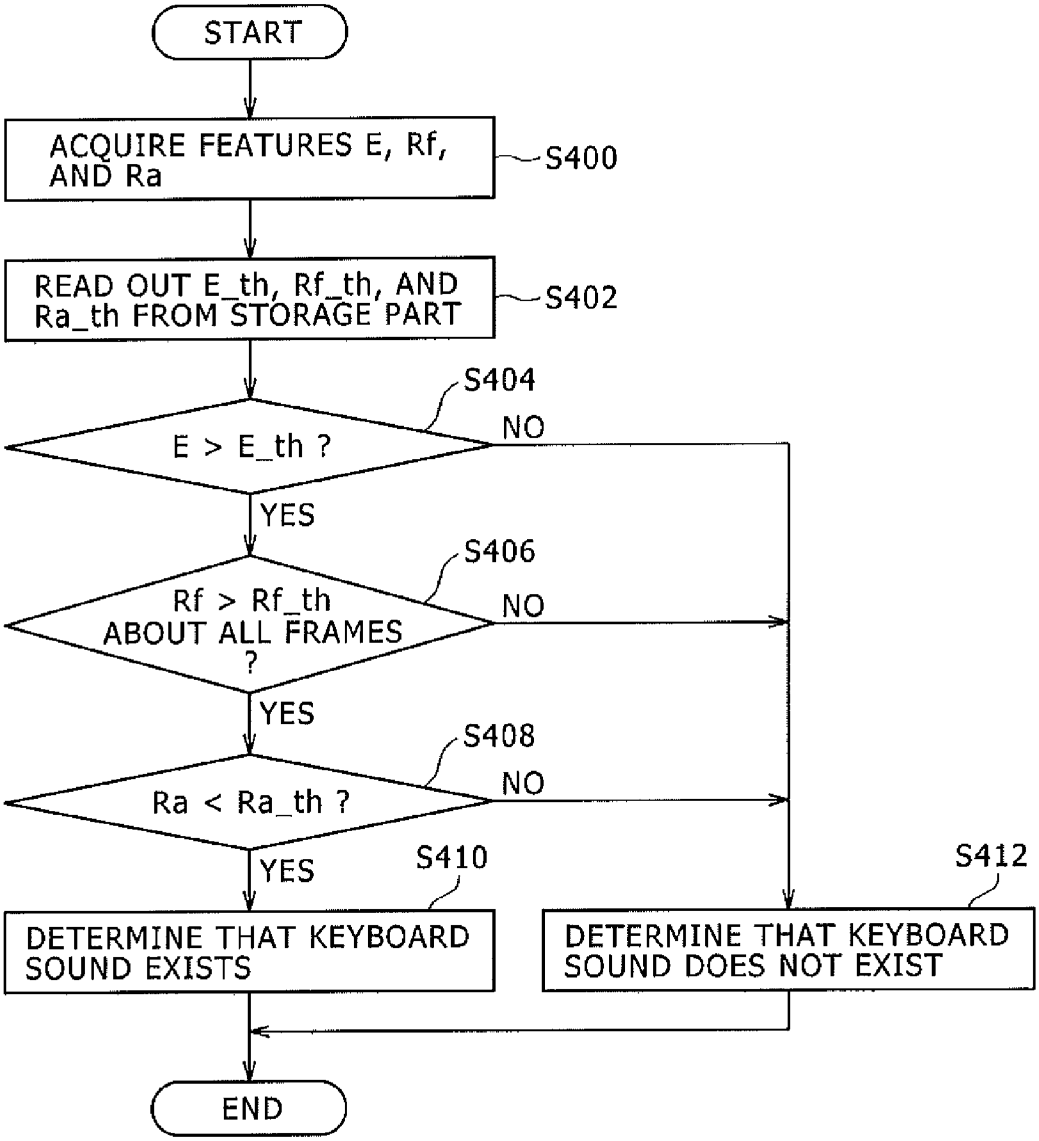
FIG. 29 is a flowchart showing the detailed operation of the noise determiner according to the first embodiment.

Next, with reference to FIG. 29, the detailed operation of the noise determiner 28 according to the present embodiment will be described below. FIG. 29 is a flowchart showing the detailed operation of the noise determiner 28 according to the present embodiment.

As shown in FIG. 29, first, the noise determiner 28 acquires the amplitude feature E, the frequency feature Rf, and the attenuation feature Ra from the amplitude detector 22, the frequency feature calculator 24, and the attenuation feature calculator 26, respectively (step S400). Of these parameters, the frequency feature Rf is calculated for each of the frames F obtained by dividing the audio signal (see FIG. 14C) as described above. Therefore, the noise determiner 28 acquires frequency features Rf(1), Rf(2), Rf(3), . . . corresponding to the respective frames F.

Subsequently, the noise determiner 28 reads out a threshold value E_th of the amplitude feature, a threshold value Rf_th of the frequency feature, and a threshold value Ra_th of the attenuation feature from the storage part 286 (step S402). These threshold values E_th, Rf_th, and Ra_th are set to proper values in advance depending on the kind and signal characteristics of the noise signal desired to be detected.

Subsequently, the noise determiner 28 compares the features E, Rf, and Ra acquired in the step S400 with the threshold values E_th, Rf_th, and Ra_th, respectively, and determines whether or not the noise signal of a keyboard sound or the like is present based on these comparison results (steps S404 to S408).

Specifically, first, the noise determiner 28 compares the amplitude feature E with the threshold value E_th (step S404). If E is larger than E_th, the noise determiner 28 executes processing of the step S406 because there is a possibility that a keyboard sound exists. If E is equal to or smaller than E_th, the noise determiner 28 determines that a keyboard sound does not exist (step S412). The amplitude feature E is the signal energy of the leg immediately after the noise start point P (base time T0) of the audio signal (see the above-described equation (1)). As just described, in the present embodiment, not the amplitude value A when noise is detected but the amplitude feature E, which is the signal energy immediately after noise detection, is utilized to determine whether or not a keyboard sound exists. The reason for this will be described below.

As shown in FIG. 3, the noise signal of the keyboard sound has a characteristic that it keeps the high amplitude value A continuously after the signal rising edge at the base time T0, and the signal energy E of the leg immediately after the base time T0 is also high to some extent. In contrast, a pulse-like noise signal like that shown in FIG. 2 rapidly attenuates after its signal rising edge and therefore its signal energy is lower than that of the keyboard sound. If noise is determined based on only the amplitude value A when noise is detected, possibly the pulse-like noise like that shown in FIG. 2 is also erroneously determined as a keyboard sound. So, in the present embodiment, not the amplitude value A at the base time T0 but the signal energy of the predetermined leg immediately after the base time T0 is used as the criterion for noise determination. This makes it possible to exclude the pulse-like noise signal like that shown in FIG. 2 and properly detect only particular noise such as a keyboard sound like that shown in FIG. 3.

The threshold value E_th is set to a proper value dependent on the amplitude value and duration of the noise signal of the keyboard sound as the detection subject. For example, the value equal to α (e.g. α=0.5) times the signal energy on the basis of the reference amplitude value Bth with which the AGC function is enabled may be set as E_th.

[Expression 8]

$$E_{th} = \frac{1}{N}\sum_{m=T_0}^{T_0+N-1} B_{th}^2 \times \alpha \tag{9}$$

Subsequently, the noise determiner 28 compares the frequency features Rf(1), Rf(2), Rf(3), . . . of the respective frames F after the base time T0 with the threshold value Rf_th (step S406). If Rf(1), Rf(2), Rf(3), . . . of all frames existing within the predetermined time Tth from the base time T0 are larger than Rf_th, the noise determiner 28 executes processing of the step S408 because the possibility that a keyboard sound exists is high. In contrast, if at least one Rf of Rf(1), Rf(2), Rf(3), . . . is equal to or smaller than Rf_th, the noise determiner 28 determines that a keyboard sound does not exist (step S412).

The noise signal of a keyboard sound like that shown in FIG. 3 includes high-frequency components continuously over the predetermined time Tth (e.g. 0.02 seconds) after the base time T0. In contrast, a pulse-like noise signal like that shown in FIG. 2 rapidly attenuates after its signal rising edge and thus high-frequency components do not continue. Therefore, if the audio signal includes high-frequency components continuously over at least the predetermined time Tth after the base time T0, it can be estimated that a keyboard sound exists. So, in the present embodiment, it is estimated that a keyboard sound exists in the audio signal if Rf of all frames existing within the predetermined time Tth from the base time T0 is larger than the threshold value Rf_th. In this manner, the keyboard sound can be properly detected by utilizing the frequency characteristic and duration of high-frequency components of the keyboard sound in the present embodiment.

The threshold value Rf_th is set to a proper value dependent on the frequency characteristic and duration of the noise signal of the keyboard sound as the detection subject. For example, in the example of FIG. 20 and FIG. 21, the threshold value Rf_th may be set to 0.3. In this case, it can be estimated that a keyboard sound exists in the twelfth to fourteenth frames, whose frequency features Rf are larger than Rf_th. The predetermined time Tth may be decided as follows for example. Specifically, the average duration Tave of the keyboard sound is obtained by experiment in advance, and this average duration Tave or a time equal to some percentage of the average duration Tave is set as the predetermined time Tth. If the frequency feature Rf of all frames existing within this predetermined time Tth from the base time T0 is larger than the threshold value Rf_th, it is determined that the noise is a keyboard sound.

Thereafter, the noise determiner 28 compares the attenuation feature Ra with the threshold value Ra_th (step S408) and determines that a keyboard sound in the audio signal exists if Ra is smaller than Ra_th (step S410). If Ra is smaller than Ra_th, it can be said that the signal after the elapse of Td from the base time T0 has sufficiently attenuated to a predetermined amplitude value or smaller from the signal at the base time T0 and the input signal is equivalent to the model of the noise signal of the keyboard sound. In contrast, if Ra is equal to or larger than Ra_th, the signal after the elapse of Td from the base time T0 has not attenuated and thus the noise determiner 28 determines that a keyboard sound does not exist (step S412).

As shown in FIG. 3, the particular noise signal of a keyboard sound or the like gradually attenuates after keeping the high amplitude value A over the predetermined time Tth. So, by determining whether or not a noise signal is present by using the attenuation feature Ra in the step S408, the attenuation state of this noise signal can be accurately achieved. Thus, whether or not a keyboard sound or the like is present can be determined with higher accuracy compared with the case of making a determination by using only the frequency feature Rf.

The threshold value Ra_th is set to a proper value dependent on the duration and attenuation state of the noise signal of the keyboard sound as the detection subject. For example, in the example of FIGS. 26A and 26B, the threshold value Ra_th may be set to −1.5. In this case, the attenuation feature Ra of the thirteenth frame corresponding to the base time T0 is smaller than Ra_th and therefore it can be estimated that the noise signal whose signal rising edge is detected at the base time T0 is a keyboard sound.

If the attenuation feature Ra is calculated by the attenuation feature calculator 26 for each of the frames F obtained by dividing the audio signal on the basis of the base time T0 (see FIG. 14C), the noise determiner 28 acquires the attenuation features Ra(1), Ra(2), Ra(3), . . . corresponding to the respective frames F (S400). In this case, the noise determiner 28 compares each of Ra(1), Ra(2), Ra(3), . . . with the threshold value Ra_th (S408) and can specify the position of the noise end point Q of the noise signal based on the comparison result. For example, in the example of FIGS. 26A and 26B, Ra is smaller than Ra_th in the thirteenth and fourteenth frames but returns to a value larger than Ra_th in the fifteenth frame. It can be estimated that the timing when Ra returns to a value equal to or larger than Ra_th is the noise end point Q of the noise signal. In this manner, even the noise end point of the particular noise signal of a keyboard sound or the like can also be specified based on the transition of the attenuation feature Ra.

As described above, in the audio signal processing method according to the present embodiment, three kinds of features E, Rf, and Ra are calculated by analyzing the input audio signal and whether or not particular noise such as a keyboard sound is present and the noise leg thereof can be properly determined by using the features E, Rf, and Ra. In the example shown in FIG. 29, the respective features E, Rf, and Ra are individually compared with the threshold values E_th, Rf_th, and Ra_th to determine whether or not noise is present. That is, the arithmetic part 282 and the comparator 284 shown in FIG. 27 are configured as the same constituent element. However, the configuration is not limited to this example. Noise determination may be carried out by calculating one evaluation value v obtained by synthesizing the features E, Rf, and Ra and comparing this evaluation value v with the threshold value v_th. As another technique, e.g. linear discrimination may be utilized as the noise determination and there is no limit on the kind of feature identification means for the noise determination.

2. Second Embodiment

Audio signal processing apparatus and audio signal processing method according to a second embodiment of the present disclosure will be described below. The second embodiment is different from the first embodiment in that noise is determined by using only the frequency feature Rf without using the amplitude feature E and the attenuation feature Ra. The other functional configuration of the second embodiment is substantially the same as that of the first embodiment and therefore detailed description thereof is omitted.

[2.1. Functional Configuration of Audio Signal Processing Apparatus]

Figure 30:
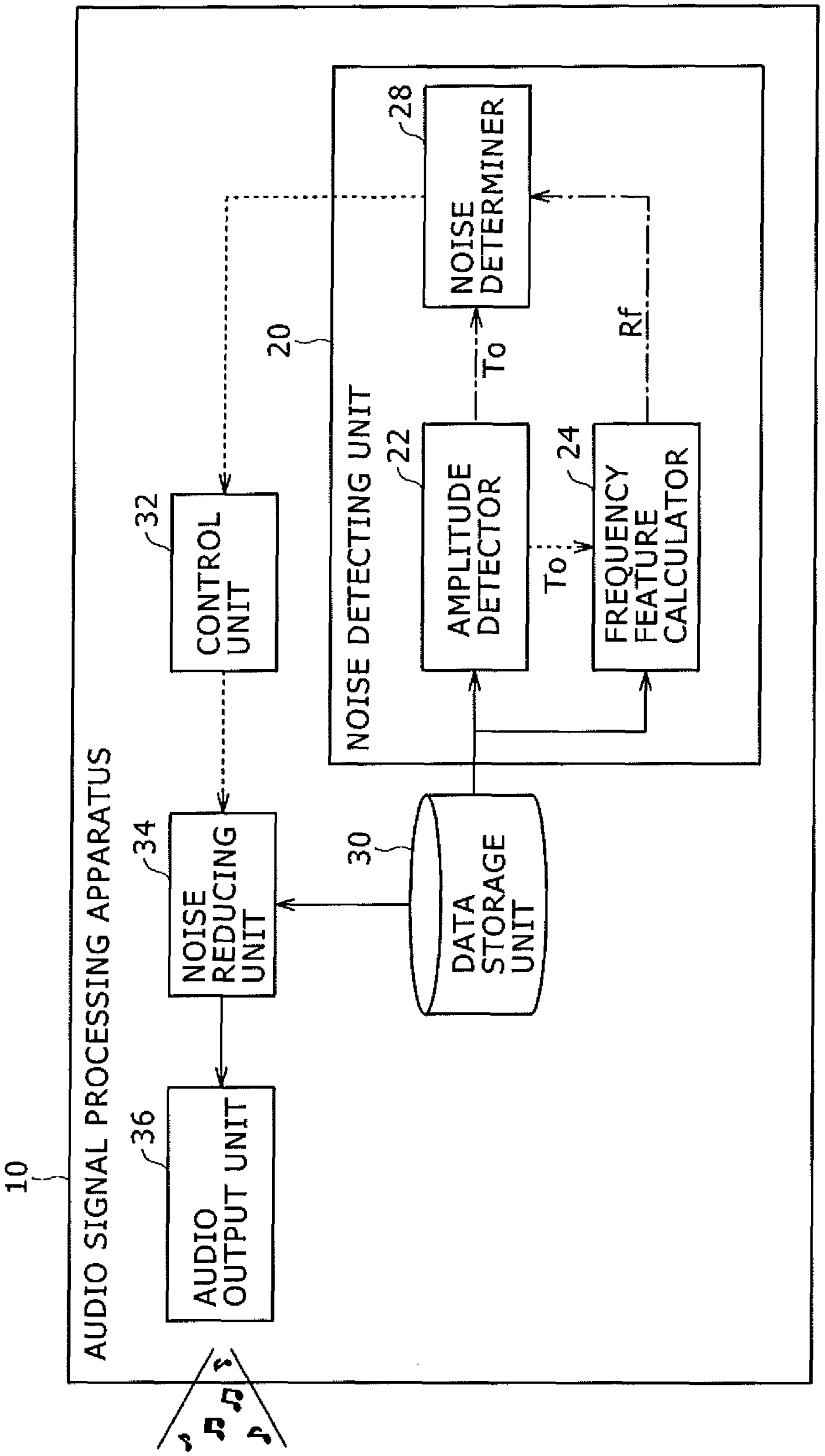
FIG. 30 is a block diagram showing the functional configuration of an audio signal processing apparatus 10 according to a second embodiment of the present disclosure.

First, with reference to FIG. 30, a functional configuration example of an audio signal processing apparatus 10 according to the second embodiment will be described. FIG. 30 is a block diagram showing the functional configuration of the audio signal processing apparatus 10 according to the second embodiment.

As shown in FIG. 30, the audio signal processing apparatus 10 includes a noise detecting unit 20, a data storage unit 30, a control unit 32, a noise reducing unit 34, and an audio output unit 36. The noise detecting unit 20 includes an amplitude detector 22, a frequency feature calculator 24, and a noise determiner 28. As just described, the audio signal processing apparatus 10 according to the second embodiment is different from the audio signal processing apparatus 10 according to the first embodiment (see FIG. 6) in that it does not include the attenuation feature calculator 26, and the noise determiner 28 determines noise by using only the frequency feature Rf without using the attenuation feature Ra. The other constituent elements of the audio signal processing apparatus 10 according to the second embodiment are the same as those of the first embodiment.

[2.2. Operation of Audio Signal Processing Apparatus]

Figure 31:
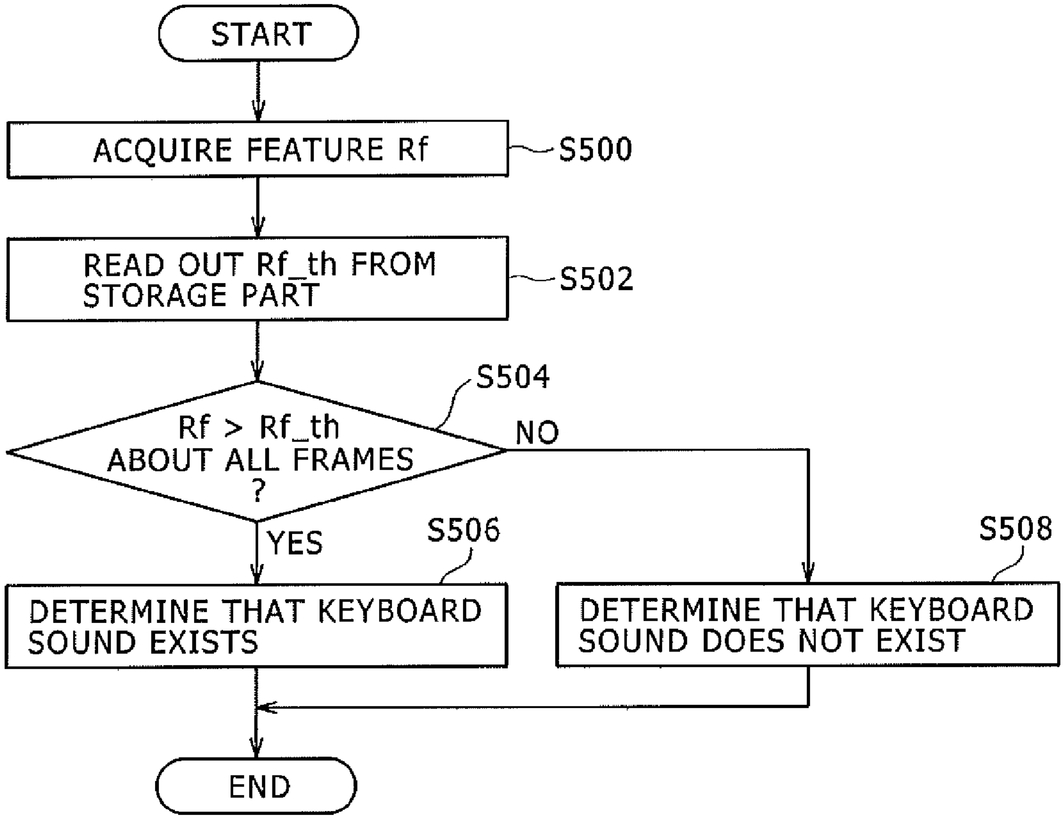
FIG. 31 is a flowchart showing the detailed operation of a noise determiner according to the second embodiment.

The detailed operation of the noise determiner 28 according to the second embodiment will be described below with reference to FIG. 31. FIG. 31 is a flowchart showing the detailed operation of the noise determiner 28 according to the second embodiment.

As shown in FIG. 31, first, the noise determiner 28 acquires the frequency feature Rf from the frequency feature calculator 24 (step S500). Subsequently, the noise determiner reads out the threshold value Rf_th of the frequency feature from a storage part 286 (step S502).

Moreover, the noise determiner 28 compares the frequency feature Rf acquired in the step S500 with the threshold value Rf_th and determines whether or not the noise signal of a keyboard sound or the like is present based on the comparison result (step S504). Specifically, the noise determiner 28 compares the frequency features Rf(1), Rf(2), Rf(3), . . . of the respective frames F after the base time T0 with the threshold value Rf_th (S504). If Rf(1), Rf(2), Rf(3), . . . of all frames existing within the predetermined time Tth from the base time T0 are larger than Rf_th, high-frequency components of the signal whose rising edge is detected by the amplitude detector 22 continue for the predetermined time Tth or longer and therefore the noise determiner 28 determines that a keyboard sound exists (step S506). In contrast, if at least one Rf of Rf(1), Rf(2), Rf(3), . . . is equal to or smaller than Rf_th, the noise determiner 28 determines that a keyboard sound does not exist (step S508).

As described above, in the audio signal processing method according to the second embodiment, the duration of high-frequency components of the particular noise signal of a keyboard sound or the like is checked by using only the frequency feature Rf, to thereby determine whether or not the particular noise signal of a keyboard sound or the like is present. Due to this characteristic, although the detection accuracy is lower than that of the first embodiment, the existence of the particular noise signal of a keyboard sound or the like can be detected with higher accuracy compared with the related-art method in which noise is detected by using only the amplitude value of the timing of the signal rising edge.

3. Conclusion

The signal processing devices and methods according to preferred embodiments of the present disclosure have been described above. The embodiments can properly detect sudden noise generated at a position separate from the audio recording apparatus 1 to record an audio signal by a predetermined distance or longer, specifically e.g. particular sudden noise such as a keyboard sound generated by the notebook PC 2 disposed at a position separate from the audio recording apparatus 1 as shown in FIG. 1. This can reduce the particular sudden noise in reproduction of recorded audio and facilitate hearing of the recorded audio.

In particular, according to the first embodiment, using the features E, Rf, and Ra allows determination based on the following three determination factors: (1) the signal level (amplitude value) of the audio signal, (2) the duration of high-frequency components of the audio signal, and (3) the attenuation state of the audio signal. This makes it possible to capture the trapezoidal characteristic of the noise signal of the particular sudden noise and thus detect the particular noise signal included in the audio signal with high accuracy.

Also for operation sounds of the audio recording apparatus 1 itself, the accuracy of detection of a noise signal having long duration can be enhanced.

Preferred embodiments of the present disclosure have been described in detail above with reference to the accompanying drawings. However, the present disclosure is not limited to these examples. It should be obvious that those who have ordinary knowledge in the technical field to which the present disclosure belongs can reach various kinds of change examples or modification examples within the category of the technical idea described in the scope of the claims, and it should be understood that these examples also belong to the technical scope of the present disclosure naturally.

For example, for the above-described embodiment, a PC is exemplified as the audio signal processing apparatus 10 and an example in which noise is detected and reduced in reproduction of recorded audio is described. However, the present disclosure is not limited to this example. For example, the audio signal processing apparatus may be any reproducing device as long as it is apparatus having an audio reproducing function. Furthermore, the audio signal processing apparatus is not limited to examples of reproducing device. It may be an audio recording device having an audio recording function and may detect and reduce noise in audio recording. As just described, the audio signal processing apparatus of the embodiment of the present disclosure can be applied to any piece of electronic apparatus such as recording and reproducing device (e.g. Blu-ray disk/DVD recorder), television receiver, system stereo apparatus, imaging apparatus (e.g. digital camera, digital video camcorder), portable terminal (e.g. portable music/video player, portable game machine, IC recorder), personal computer, game machine, car navigation apparatus, digital photo frame, home electric appliance, automatic vending machine, ATM, and kiosk terminal.

What is claimed is:

1. An audio signal processing apparatus comprising:

an amplitude detector configured to detect a noise start point of an audio signal including a noise signal by comparing an amplitude value of the audio signal with a threshold value;

a frequency feature calculator configured to calculate, based on information representing the detected noise start point notified from the amplitude detector, a frequency feature representing at least a frequency characteristic of the audio signal after the noise start point; and a noise determiner configured to determine a leg continuously including high-frequency components equal to or higher than a reference frequency in the audio signal after the noise start point as a noise leg based on the frequency feature.

2. The audio signal processing apparatus according to claim 1, further comprising an attenuation feature calculator configured to calculate an attenuation feature representing attenuation of the noise signal included in the audio signal, wherein the noise determiner determines a leg that continuously includes high-frequency components equal to or higher than the reference frequency in the audio signal after the noise start point and ranges from the noise start point to a noise end point at which the noise signal attenuates to a predetermined basis or smaller as the noise leg based on the frequency feature and the attenuation feature.

3. The audio signal processing apparatus according to claim 2, wherein the attenuation feature calculator calculates, as the attenuation feature, a parameter representing a ratio between energy of the audio signal around the noise start point and energy of the audio signal around timing after elapse of a predetermined time from the noise start point.

4. The audio signal processing apparatus according to claim 2, wherein the attenuation feature calculator calculates the attenuation feature by using a signal obtained by removing low-frequency components equal to or lower than a predetermined frequency from the audio signal.

5. The audio signal processing apparatus according to claim 1, wherein the frequency feature calculator divides the audio signal after the noise start point into a plurality of legs and calculates the frequency feature for each of the legs, and the noise determiner determines whether or not the frequency feature of each of the legs is equal to or larger than a threshold value and determines at least one leg whose frequency feature is equal to or larger than the threshold value as the noise leg.

6. The audio signal processing apparatus according to claim 1, wherein the frequency feature calculator calculates a parameter representing the number of zero-cross points of the audio signal as the frequency feature.

7. The audio signal processing apparatus according to claim 1, wherein the frequency feature calculator calculates a parameter representing a ratio between all frequency components of the audio signal and high-frequency components equal to or higher than the reference frequency as the frequency feature.

8. The audio signal processing apparatus according to claim 1, wherein the amplitude detector calculates an amplitude feature representing signal energy of the audio signal around the noise start point, and the noise determiner determines whether or not the amplitude feature is equal to or larger than a threshold value and determines the noise leg based on the frequency feature if the amplitude feature is equal to or larger than the threshold value.

9. The audio signal processing apparatus according to claim 1, wherein the noise signal represents noise generated from a noise generation source at a position separate from an audio recording device used to record the audio signal by a predetermined distance or longer.

10. The audio signal processing apparatus according to claim 1, wherein the noise signal is a signal that continuously includes high-frequency components equal to or higher than the reference frequency and nonmonotonically attenuates.

11. The audio signal processing apparatus according to claim 1, further comprising a noise reducing unit configured to reduce the noise signal included in the audio signal by lowering a signal level of the noise leg in the audio signal.

12. An audio signal processing method comprising:

detecting a noise start point of an audio signal including a noise signal by comparing an amplitude value of the audio signal with a threshold value;

calculating, based on information representing the detected noise start point notified from the detecting, a frequency feature representing at least a frequency characteristic of the audio signal after the noise start point; and determining a leg continuously including high-frequency components equal to or higher than a reference frequency in the audio signal after the noise start point as a noise leg based on the frequency feature.

13. A non-transitory recording medium on which is recorded a program for causing a computer to execute:

detecting a noise start point of an audio signal including a noise signal by comparing an amplitude value of the audio signal with a threshold value;

calculating, based on information representing the detected noise start point notified from the detecting, a frequency feature representing at least a frequency characteristic of the audio signal after the noise start point; and determining a leg continuously including high-frequency components equal to or higher than a reference frequency in the audio signal after the noise start point as a noise leg based on the frequency feature.

* * * * *